United States Patent
Shu

(10) Patent No.: US 10,222,812 B2
(45) Date of Patent: Mar. 5, 2019

(54) HYBRID HIGH INTEGRITY PRESSURE PROTECTION SYSTEMS AND VALVES

(71) Applicant: Jianchao Shu, Cypress, TX (US)

(72) Inventor: Jianchao Shu, Cypress, TX (US)

(*) Notice: Subject to any disclaimer, the term of this patent is extended or adjusted under 35 U.S.C. 154(b) by 0 days.

(21) Appl. No.: 15/011,941

(22) Filed: Feb. 1, 2016

(65) Prior Publication Data
US 2017/0220053 A1 Aug. 3, 2017

(51) Int. Cl.
*F16K 17/40* (2006.01)
*G05D 16/10* (2006.01)
*F16K 25/04* (2006.01)
*F16K 17/16* (2006.01)

(52) U.S. Cl.
CPC .......... *G05D 16/106* (2013.01); *F16K 17/16* (2013.01); *F16K 25/04* (2013.01)

(58) Field of Classification Search
CPC ........ G05D 16/106; F16K 17/16; F16K 25/04
USPC ........... 137/68.19, 220, 222, 516.29, 625.38; 251/357; 277/644
See application file for complete search history.

(56) References Cited

U.S. PATENT DOCUMENTS

| | | | | |
|---|---|---|---|---|
| 1,838,723 A * | 12/1931 | Welcker | ..................... | F16K 1/12 137/220 |
| RE18,849 E * | 5/1933 | McClellan et al. | ....... | F16K 1/12 137/220 |
| 2,725,891 A * | 12/1955 | De Bourguignon | .... | F16K 1/126 137/219 |
| 2,919,714 A * | 1/1960 | Mrazek | .................... | F16K 1/126 137/220 |
| 3,113,583 A * | 12/1963 | Fox | ......................... | F16K 17/105 137/220 |
| 3,194,255 A * | 7/1965 | Flaton | ..................... | F16K 15/06 137/220 |
| 3,399,690 A * | 9/1968 | Guy | ......................... | F16K 1/126 137/220 |
| 3,587,622 A * | 6/1971 | Hardison | ................ | F16K 1/126 137/220 |
| 3,792,716 A * | 2/1974 | Sime | ........................ | F16K 1/126 137/220 |
| 3,917,220 A | 11/1975 | Gilmore | | |
| 4,008,733 A * | 2/1977 | Courant | .................... | B64F 1/28 137/220 |
| 4,681,130 A * | 7/1987 | Tabor | ...................... | F16K 1/126 137/219 |

(Continued)

*Primary Examiner* — Minh Q Le

(57) ABSTRACT

This invention relates to a Hybrid High Integrity Pressure Protection System (H-HIPPS) for severe services, the hybrid system includes a quick isolation subsystem between an overpressure zone and a normal pressure zone and a quick releasing subsystem between the overpressure zone and a lower pressure zone with quadruple redundancies for 30 year service without repair more particularly, the hybrid system has a novel valve and a novel pilot, each with two independent plugs with metal to metal seal—(buckling seal) B ring assemblies and a novel (attachable)) A seal ring assembly to block or release over pressurize fluids without actuators for protecting the pipelines or the pressures vessels from surge pressure at the highest level of a system reliability with a fast block off time, redundant sensing valves, redundant releasing methods, redundant pressure protections, and cavitations and erosion suppressor.

12 Claims, 10 Drawing Sheets

(56) References Cited

U.S. PATENT DOCUMENTS

Figure 1:
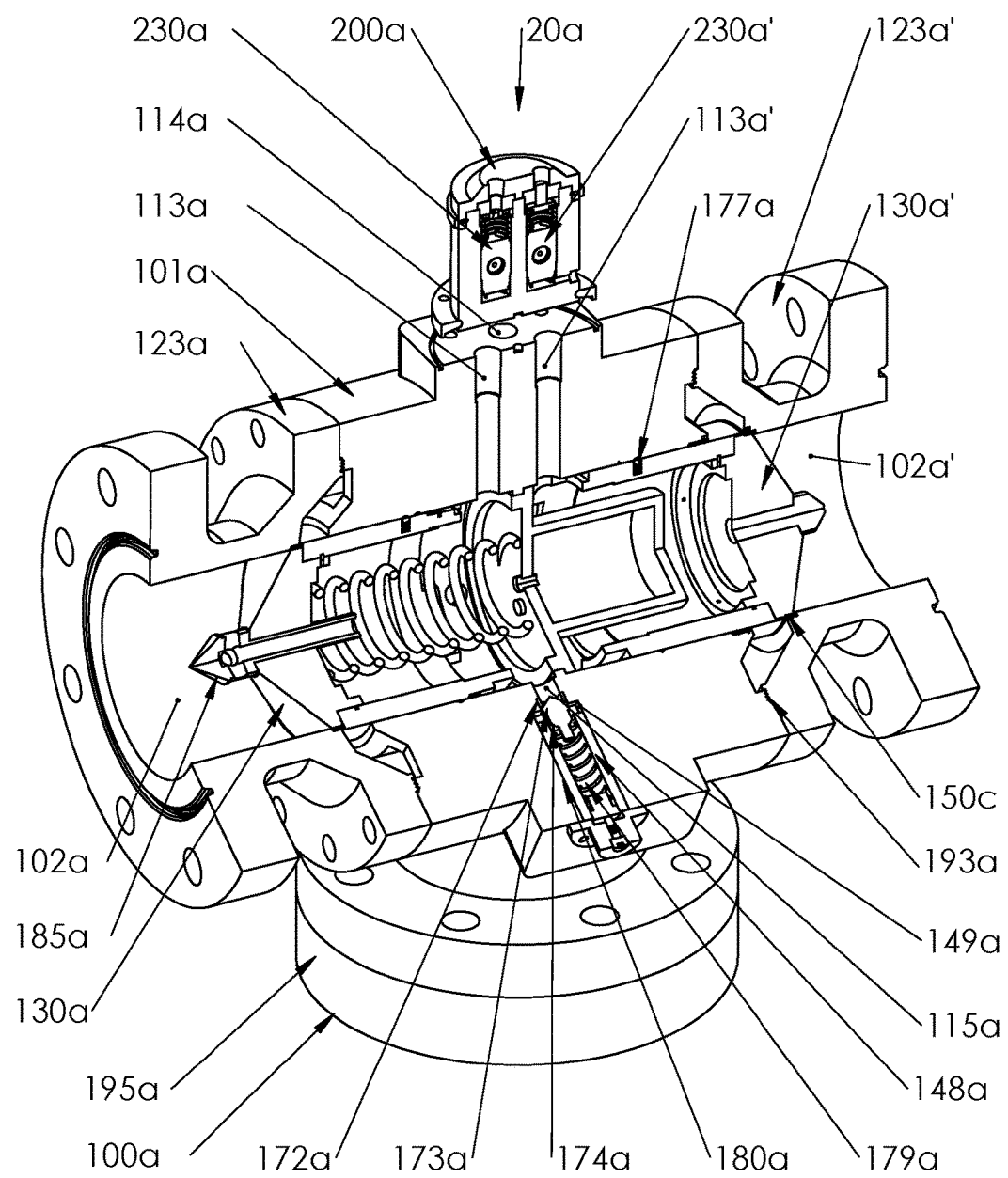

| | | | | |
|---|---|---|---|---|
| 4,911,196 | A * | 3/1990 | Kemp | F16K 15/026 |
| | | | | 137/220 |
| 5,540,252 | A * | 7/1996 | Bruun | G05D 7/0146 |
| | | | | 137/220 |
| 6,286,534 | B1 | 9/2001 | Bliss | |
| 7,284,563 | B2 | 10/2007 | Partridge | |
| 7,353,837 | B2 * | 4/2008 | Biester | F16K 1/12 |
| | | | | 137/219 |
| 7,588,047 | B2 * | 9/2009 | Vogt | F02B 37/013 |
| | | | | 137/220 |
| 8,136,543 | B2 | 3/2012 | Davies, Jr. | |
| 8,312,893 | B2 | 11/2012 | Bey | |
| 8,544,493 | B2 * | 10/2013 | Huang | F16K 15/063 |
| | | | | 137/220 |
| 8,733,737 | B2 | 5/2014 | Lewandowski | |
| 2002/0074038 | A1 * | 6/2002 | Dziorny | F01D 17/105 |
| | | | | 137/220 |
| 2016/0004256 | A1 * | 1/2016 | Volovec | G05D 7/014 |
| | | | | 137/220 |

* cited by examiner

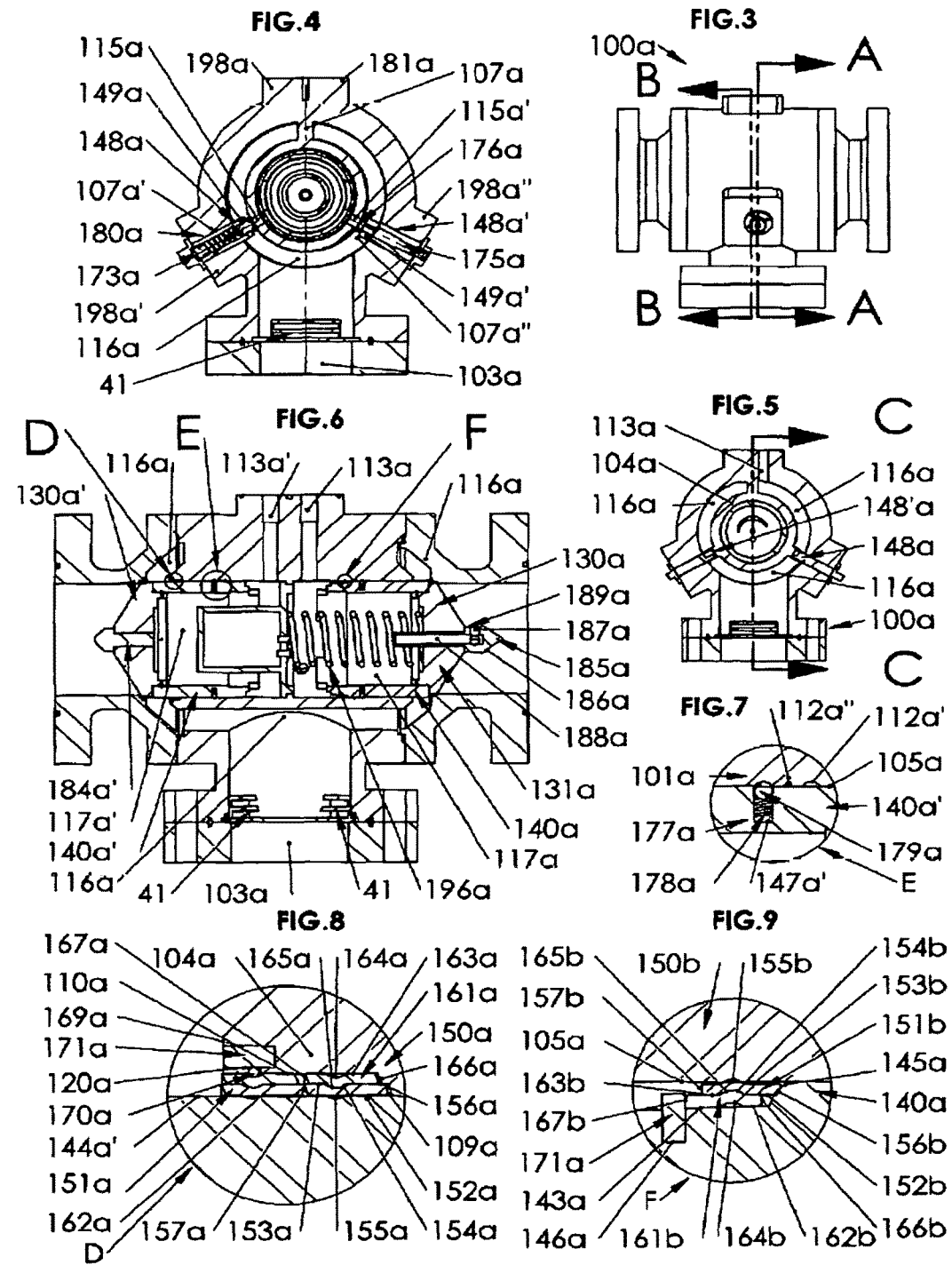

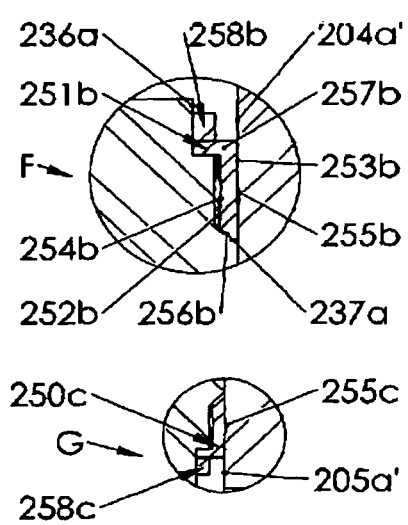
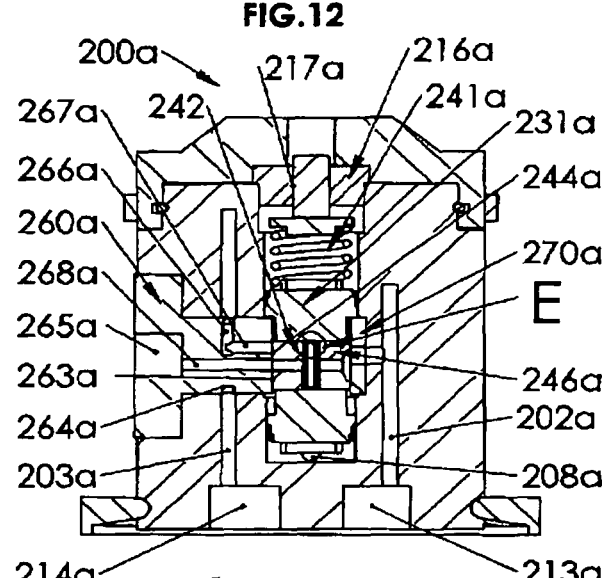
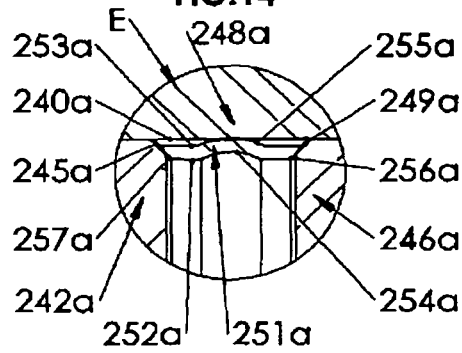
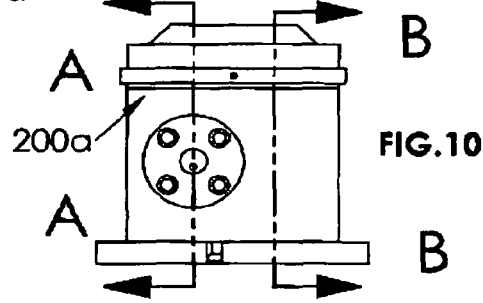
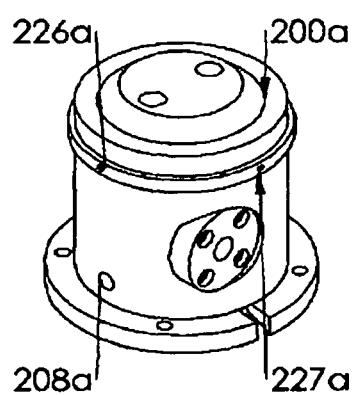
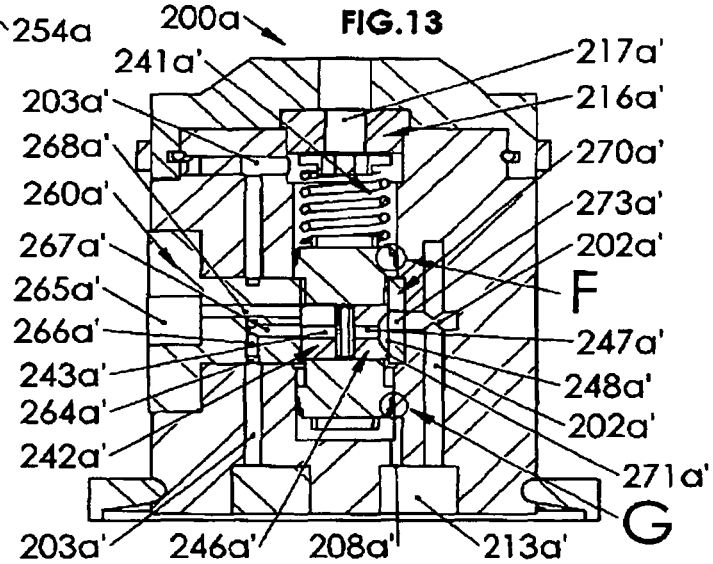

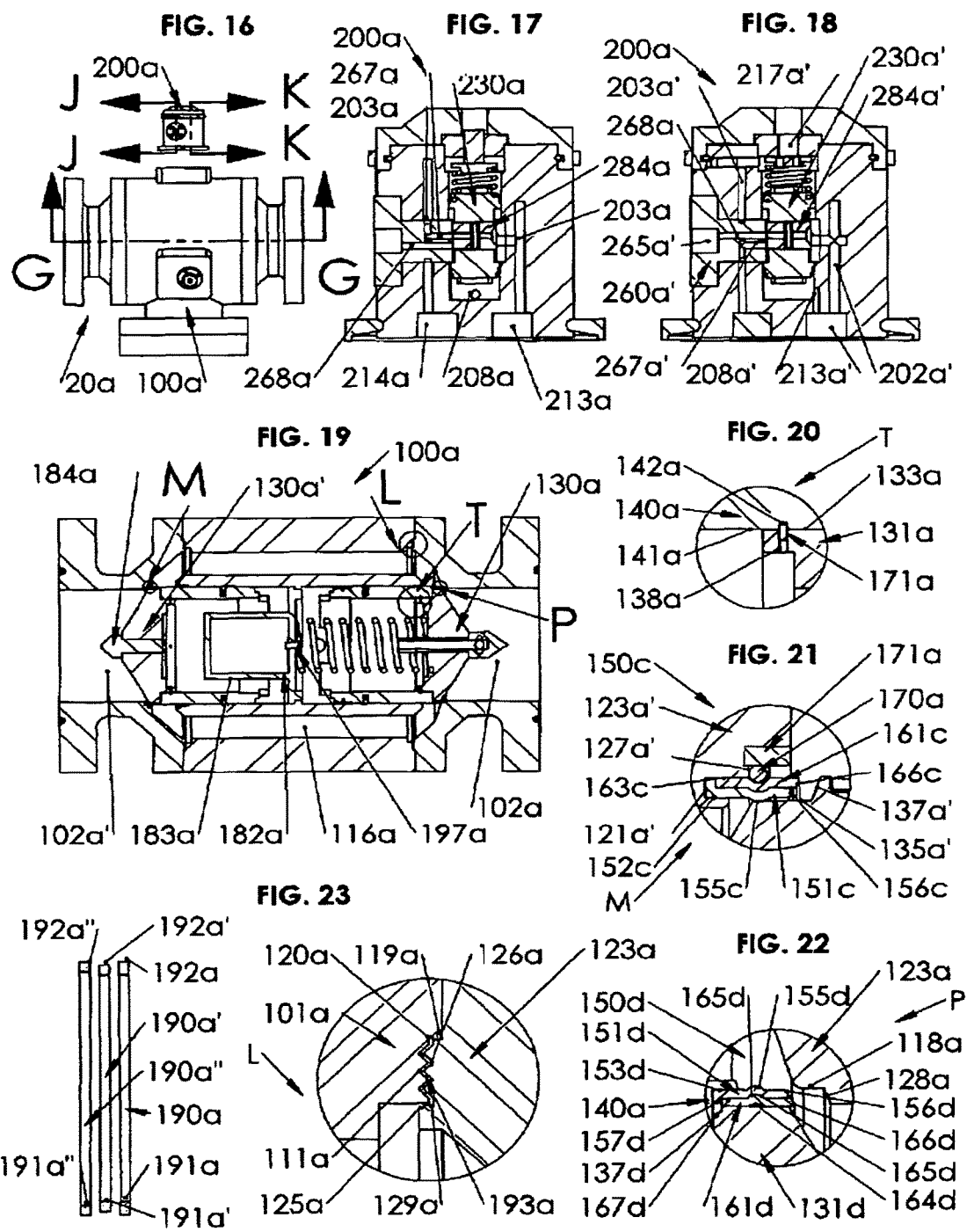

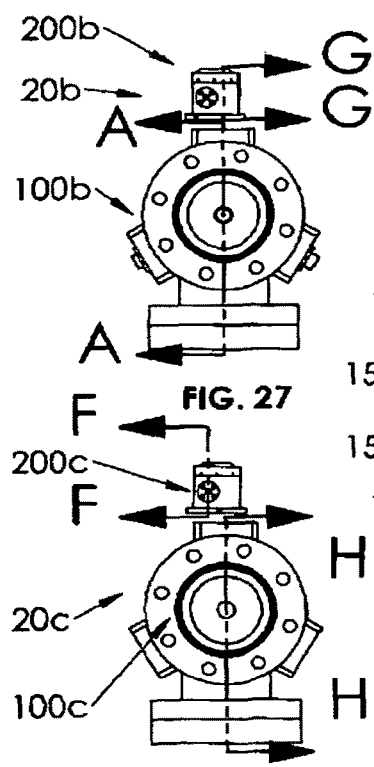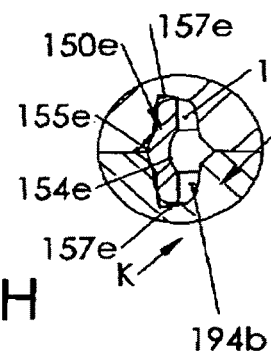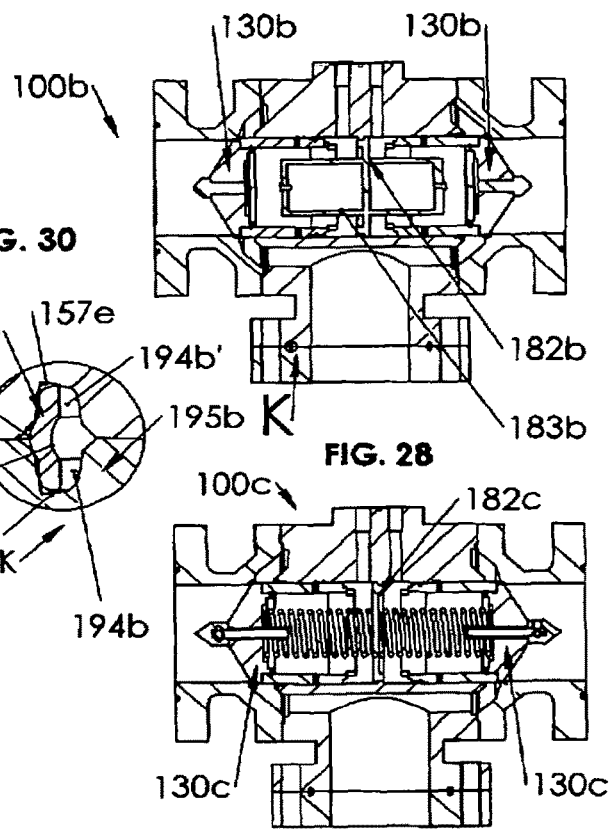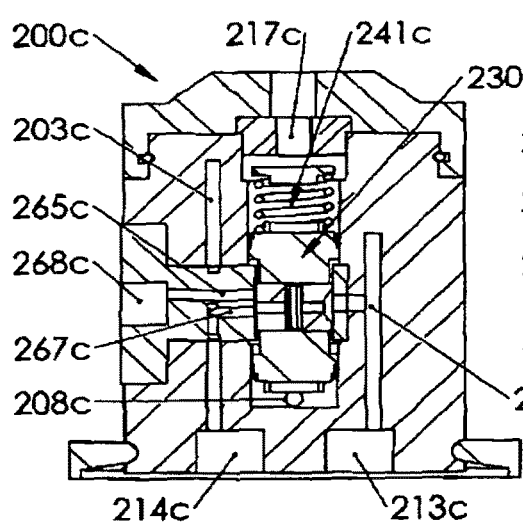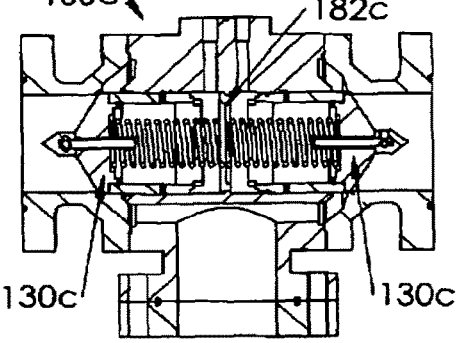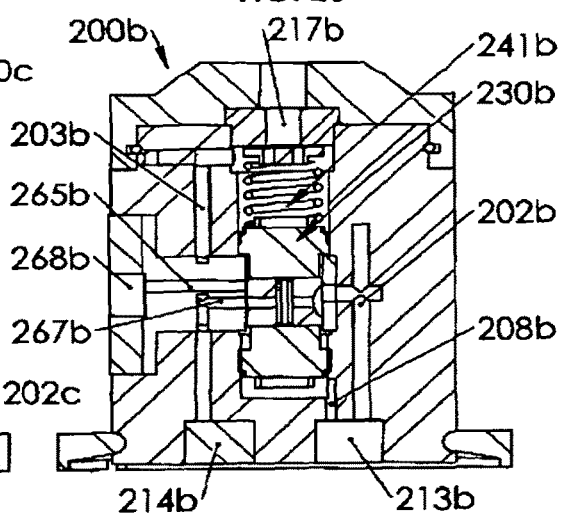

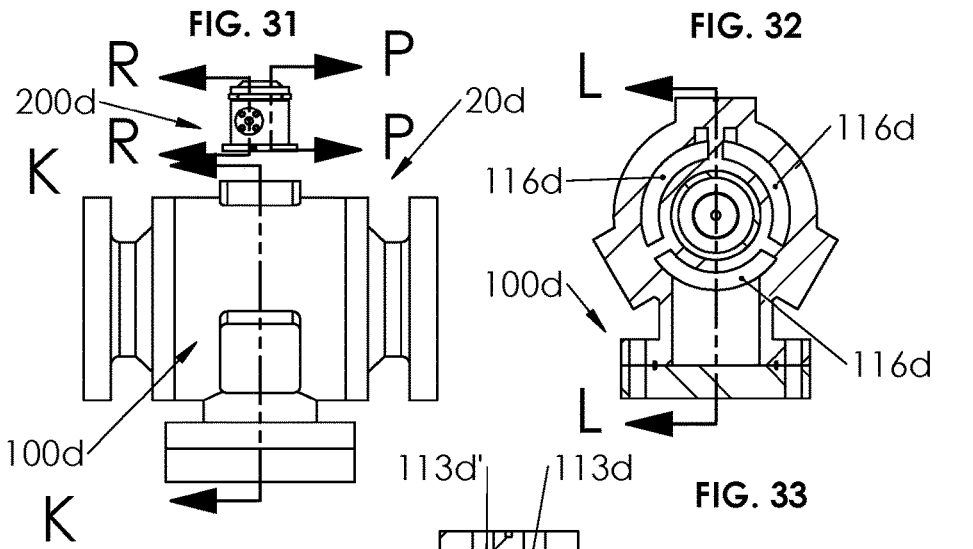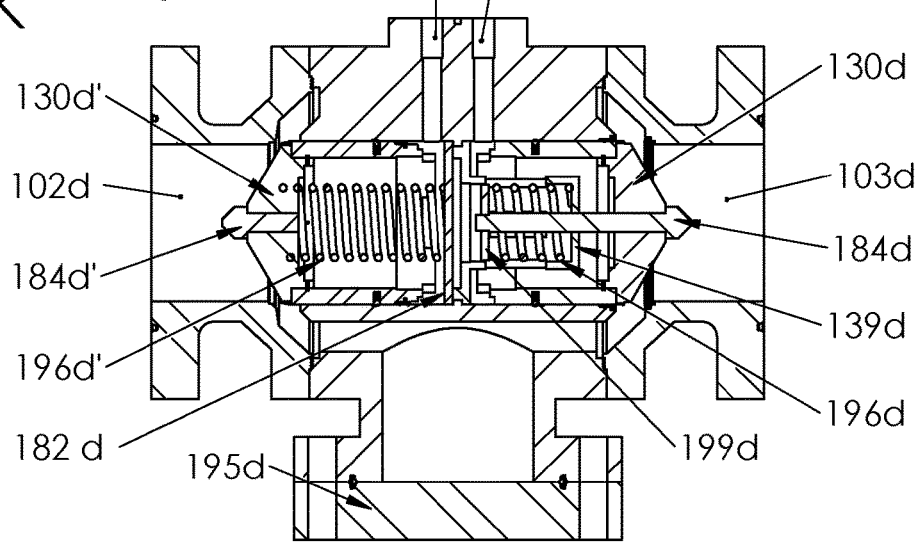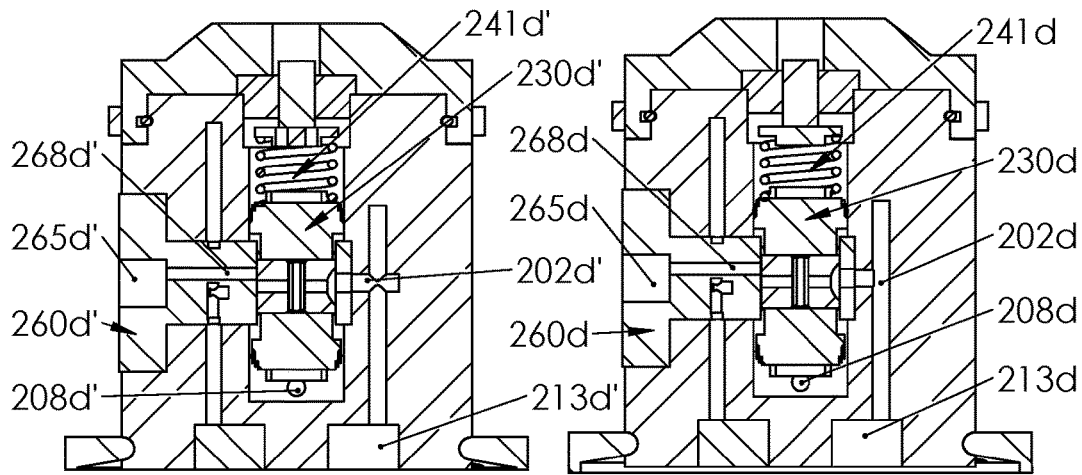

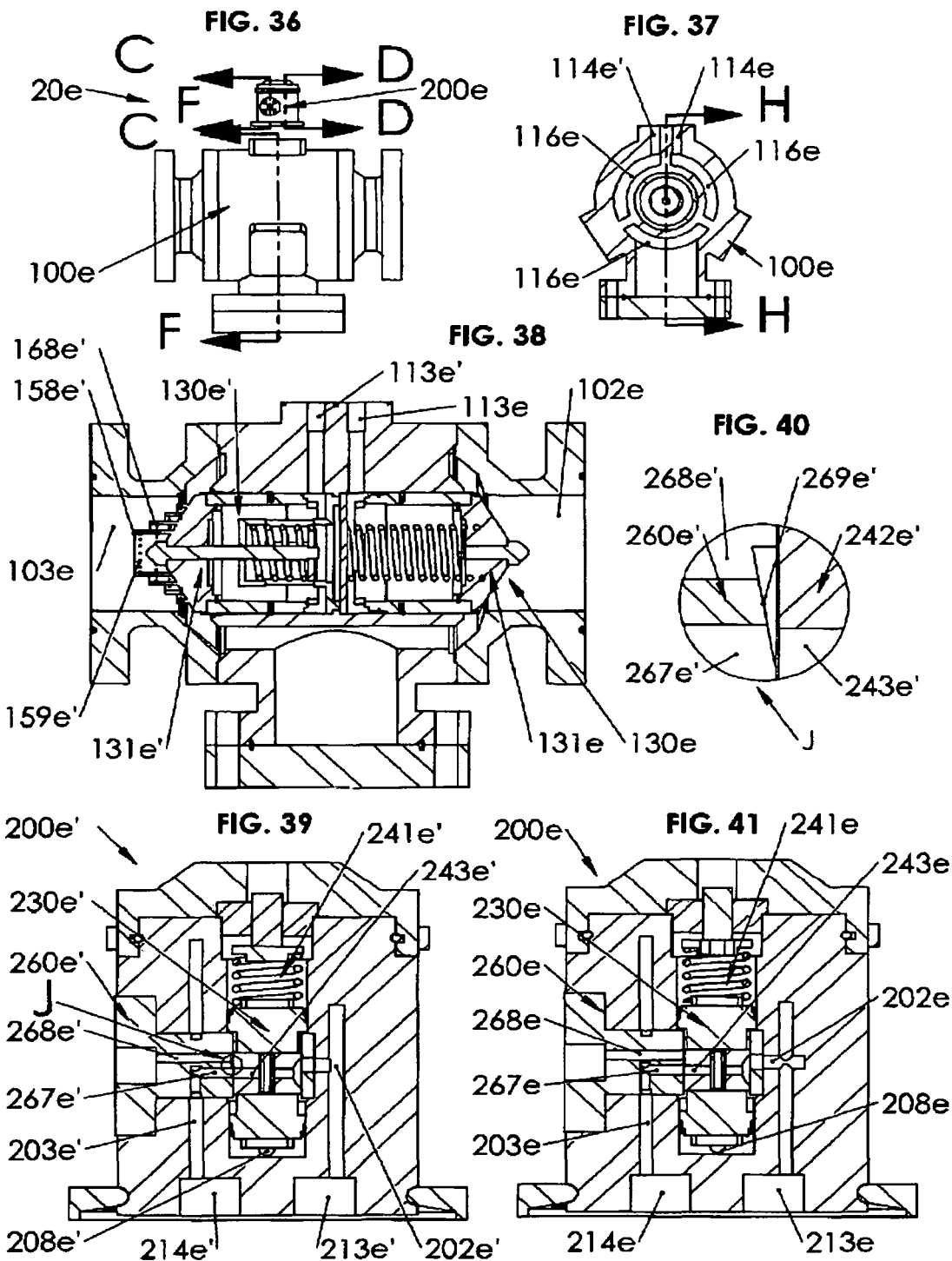

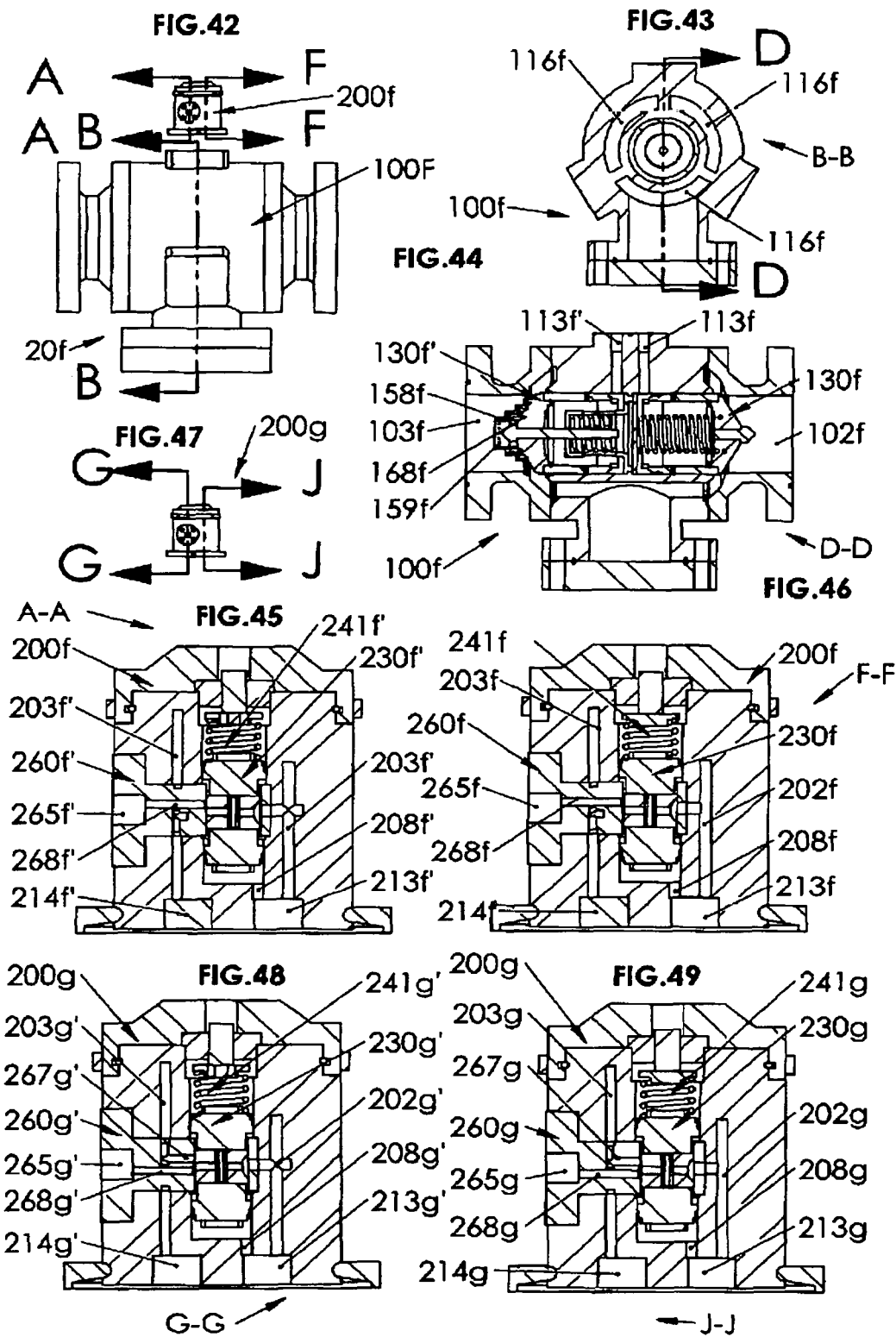

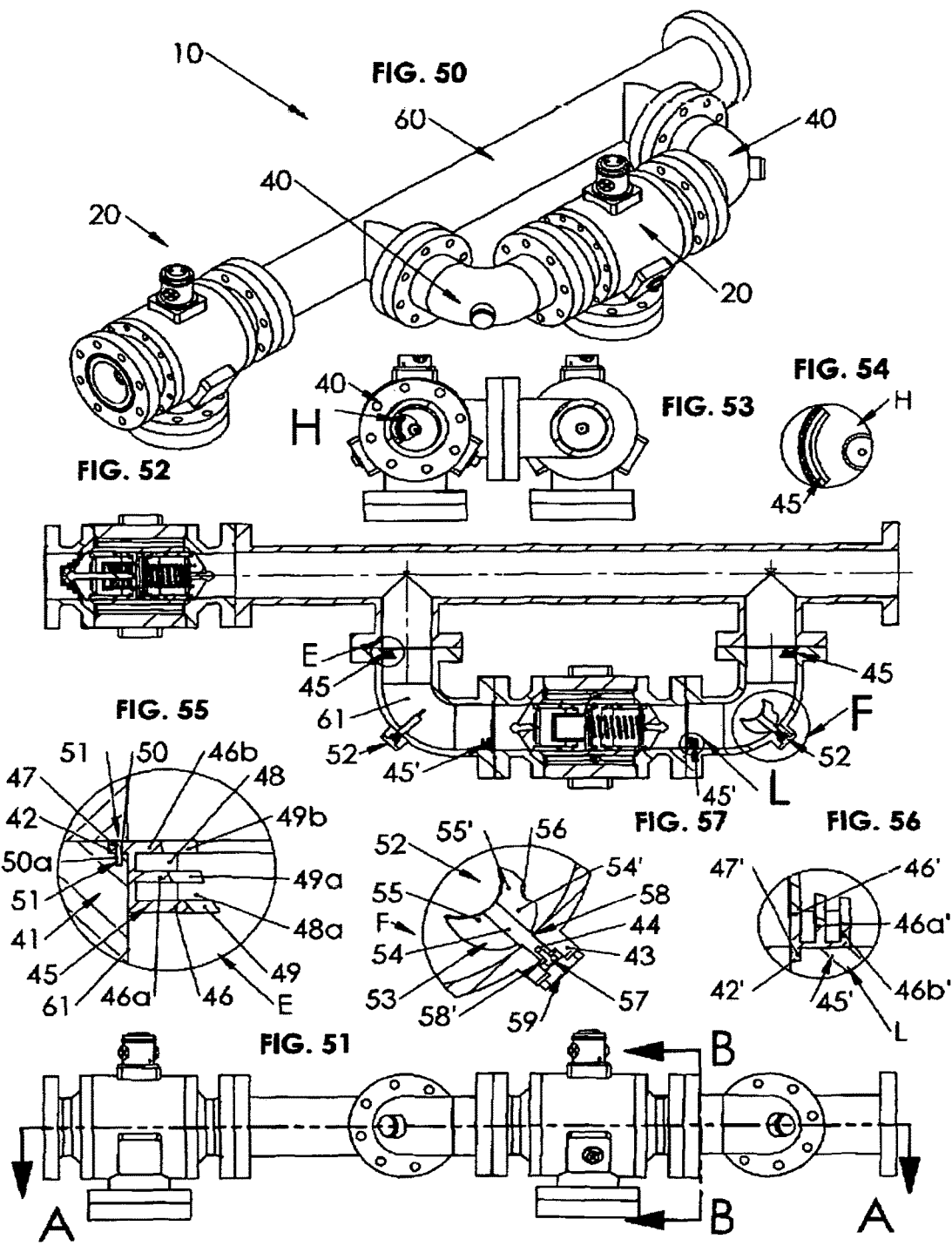

HYBRID HIGH INTEGRITY PRESSURE PROTECTION SYSTEMS AND VALVES

CROSS-REFERENCE TO RELATED APPLICATION

This application claims the benefit of provisional patent application Ser. No. 62/125,595 filed on Feb. 4, 2015 by the present inventor.

FEDERALLY SPONSORED RESEARCH

No

SEQUENCE LISTING OR PROGRAM

No

BACKGROUND

This invention relates to a Hybrid High Integrity Pressure Protection System (H-HIPPS) for severo services, the hybrid system includes a quick isolation subsystem between an overpressure zone and a normal pressure zone and a quick releasing subsystem between the overpressure zone and a lower pressure zone with quadruple redundancies for 30 year service without repair, more particularly, the hybrid system has a novel valve and a novel pilot, each with two independent plugs with metal to metal seal (buckling seal) B ring assemblies and a novel (attachable) A seal ring assembly to block or release over pressurize fluids without actuators for protecting the pipelines or the pressures vessels from surge pressure at the highest level of a system reliability, the quick releasing subsystem has novel hybrid and redundant pressure relief mechanisms, redundant pressure sensing mechanisms and secondary pressure surges depressor, cavitations and erosion suppression and detect mechanisms, while quick isolation subsystem has redundant closures members and cavitations reducer can be used for a control valve or pressure regulator with the best both static and dynamic performances, in most cases, two valves are used, one for isolating fluids, one for regulating the fluids.

When pipelines or pumping stations or piping terminals, pressurized fluids plants are in services, many times, the operations like open and closing, pumping and metering can cause water hammer and pressure surge, the pressure surge in pipelines or plant can cause many problems as following; (a) Axial temporal and permanent separation of flange joints (b) Pipe fatigue at weld joints (c) Longitudinal pipe splits (d) Severe damage to piping and piping supports (e) Severe damage to elbow (f) Pipe leak (g) High cost for constant repair (h) inaccurate metering due to leaks in supply stations (i) environmental pollution.

There are two solutions for the problem (1) to block the overpressure fluid zone into a normal pressure zone or (2) to release the overpressure fluid into a low pressure zone, the conventional quick blocking subsystems like HIPPS based on API 17O is equipped with two shut off valves, two actuators and pressure transmitters and a feedback control system, but this subsystem at this point is just a combination of conventional parts like valves, actuators and pressure sensors and controller at a lower system reliability and is constructed under overpressure class at least three time in overpressure fluid zone even for a short period time and waste lot of materials and capacity in normal pressure conditions, so far there is no single valve or actuator, which are developed for the high integrity system, while the conventional quick releasing subsystem is constructed as overpressure safety device under U.S. Department of Transportation, Pipeline Safety Regulations, Hazardous Liquids Part 195, paragraph 195.428, the subsystem includes the pressure surge relief valve s like plug axial pressure surge relief valves, those valves are widely used in the pipeline protection from pressure surge and constructed with main three functions sensing, tracking and releasing, the plug axial pressure surge relief valves have two types, a gas loaded and a pilot operated configurations, the gas loaded pressure surge relief system has a fast response time about 250 millisecond, but it is equipped with external energy resources like pressurized bottle nitrogen, pressure regulator, check valve, tubing, insolated plenum bottle and control boxes, the subsystem not only increase cost and reduce a system reliability and sensible to temperature swing, but also has high operation cost to remain the set pressure with high cavitation and erosion, while the pilot relief system is operated by internal fluid energy with a compact pilot, but the pilot has a remote pressure sensing function and slow response time about two second or more and is less tolerated with dirty fluid and unreliable, every pressure releasing causes 10 to 30% pressure or energy loss and with high cavitation and erosion, in short the both type subsystems have no redundant system and cannot provide a good seal at low temperature, or high temperature and have high blow down pressure up to 30% and waste significant fluid energy and need constant seal goods replacements.

So the flow control industry has long sought means of improving the performance of the pressure protection valve and systems valve, improving the seal, creating a robust hybrid, enabling the valve to handle various flows under multiple extreme conditions.

In conclusion, insofar as I am aware, no such a system is formerly developed with fully metal to metal seal, hybrid highly reliable pressure protection system, easy manufacturing at low cost, they can be used for blocking and releasing overpressure fluids in sever service.

SUMMARY

This invention provides a simple, robust, reliable and versatile hybrid pressure protection system for severe services or under extreme conditions. This hybrid pressure protection system not only release overpressure fluid into lower pressure zone but also block overpressure fluid into normal pressures zone, and greatly reduce total isolation time, increase reliability with four redundancies, the subsystem has a valve and a pilot, the valve has two pockets respectively to receive two plug assemblies, each plug assembly works as an independent valve, the pilot has two vertical bores respectively receive two pilot plug assemblies, each pilot plug assembly works as an independent pilot to control each closures assembly in the valve, each plug assembly has a metal B ring assembly for sustaining seals and wiper slurry fluid or fluids with solid particles fast closing impact forces without damage, metal B ring assembly is based on buckling theory, the deformation of metal seal is away below yield strength of the material, the A ring with attachable function play a key role in the system for preventing pipe leak even under temporal separation of axial flange joint due to water hammer and keep the leakage between 0-50 ppm or under high thermal change and high pressure, the redundancy feature is applied for the valve and the pilot, those include two plug valves, two pressure sensing devices, two pressure relief paths, two pressure protection methods, reach the highest level of system reliability over all prior arts or existing products the system comprises three type system with a normal open, normal closed and the combination.

This subsystem can be used for normal closed, normal open and between positions with small modifications, with a blind flange attached on the body, the subsystem has one inlet and one outlet for on-off or throttling applications, the pilot can be used for two pressure regulators with sensing port connected to outlet port.

The erosion/cavitation reducing assembly is other feature for the system to reduce cavitation and erosion level, it comprises a pair of trims and a rotor assembly, the trim assembly comprise a pair of fins each fin is defined by a front surface, area of fin and gaps between each fin, the trim has step bore with pin hole with one pin installed between the elbow and the flange, the rotor assembly has a rotor, the rotor has three blades, one of the blade with a slot, so the rotator will generate a unbalanced rotation as the fluid pass, in turn the unbalanced rotation will create a designed vibration, and the vibrations feature will change as the erosion process developed, the gaps between the elbow wall and the blades will increase, the erosion can be monitored, detected and predicted through the vibration data, while one of the blade with magnetic material, so the rotation can be monitored detected by a magnetic sensor or instrument, so those two data can be verified with high accuracy, those devices are very useful and critical for subsea and underground pipeline or remote area, where human accesses are impossible or difficult.

Finally the plug can be modified with a trim for handling cavitations and erosion application, the dynamic trim is installed in the outlet plug, the trim will not restrict the flow capacity as plug move between open and closed positions, in the most cases, the cavitation and erosion happen at small opening, as the plug has the conical front surface with multiple cylindrical rings to gradually restrict the open flow but with multiple holes to release the flow, such a arrange prevents the pressure drop below a fluid vapor pressure, so cavitations can be reduced or avoided, the front plate of the plug can be made with different materials from the base ring and be easily replaced.

Accordingly, besides objects and advantages of the present invention described in the above patent, several objects and advantages of the present invention are:

(a) To provide high redundant pressure protection system, such a system has the highest system reliability for serve services or extreme conditions.
(b) To provide a pressure sensing device with a fast response time and releasing time, so such a system can protect a pipeline or critical vessel for severe service and has long life and high reliability.
(c) To provide a metal to metal seal with ability to sustain high closing impact force for extreme conditions: fast closing, high pressure, cryogenic or high temperature or fire-safe applications. Such a seal ring can keep good static and dynamic seals with low leakage between 0-50 ppm.
(d) To provide a seal with an attachable feature under extreme conditions: high pressure, cryogenic or high temperature or fire-safe applications. Such a seal ring can keep good seals with low leakage between 0-50 ppm under axial temporal separation of flange joints.
(e) To provide a reliable pilot for controlling a valve in a pressure protection system, so the pilot can provide fast response time, reliable performance has and buildup-proof seal and mechanisms and long life for severe service.
(f) To provide a device with functions to reduce erosion and cavitation as well as to monitor, detect and predict the process of erosion and cavitation, so the system has an ability to prevent fluid leak and predict efficiently the repair damage or replacements at good timing before the accidents happen.
(g) To provide a highly efficient movable trim in a choked flow, so such a trim has a compact, simple structure to reduce the cavitations and erosions without high pressure drops.
(j) To provide a highly efficient trim to reduce the cavitations without reducing the flow capacity, so such a trim can handle slurry fluid or fluid with solid particles or dissipate fluid energy under high pressure like damping valve used in water dam.
(k) To provide a pressure protection system without external actuation, stem, so such a valve can avoid the actuation failure, a stem leak.
(l) To provide a pressure protection system with solid/liquid interaction mechanisms to reduce the blocking time and releasing time, so the system can reduce the damage of pressure surge to minimum and cost of the system.
(m) To provide fully metal to metal coal pressure protection system, so the system last 25 to 50 year service and fire safety service, the maintain period would increase at least five year period and reduce the operation cost and increase reliability.
(n) To provide heat reservoir mechanism, so the system can use less pressurized gas and reduce operation cost and increase reliability.

Still further objects and advantages will become apparent from study of the following description and the accompanying drawings.

DRAWINGS

Drawing Figures

Figure 2:
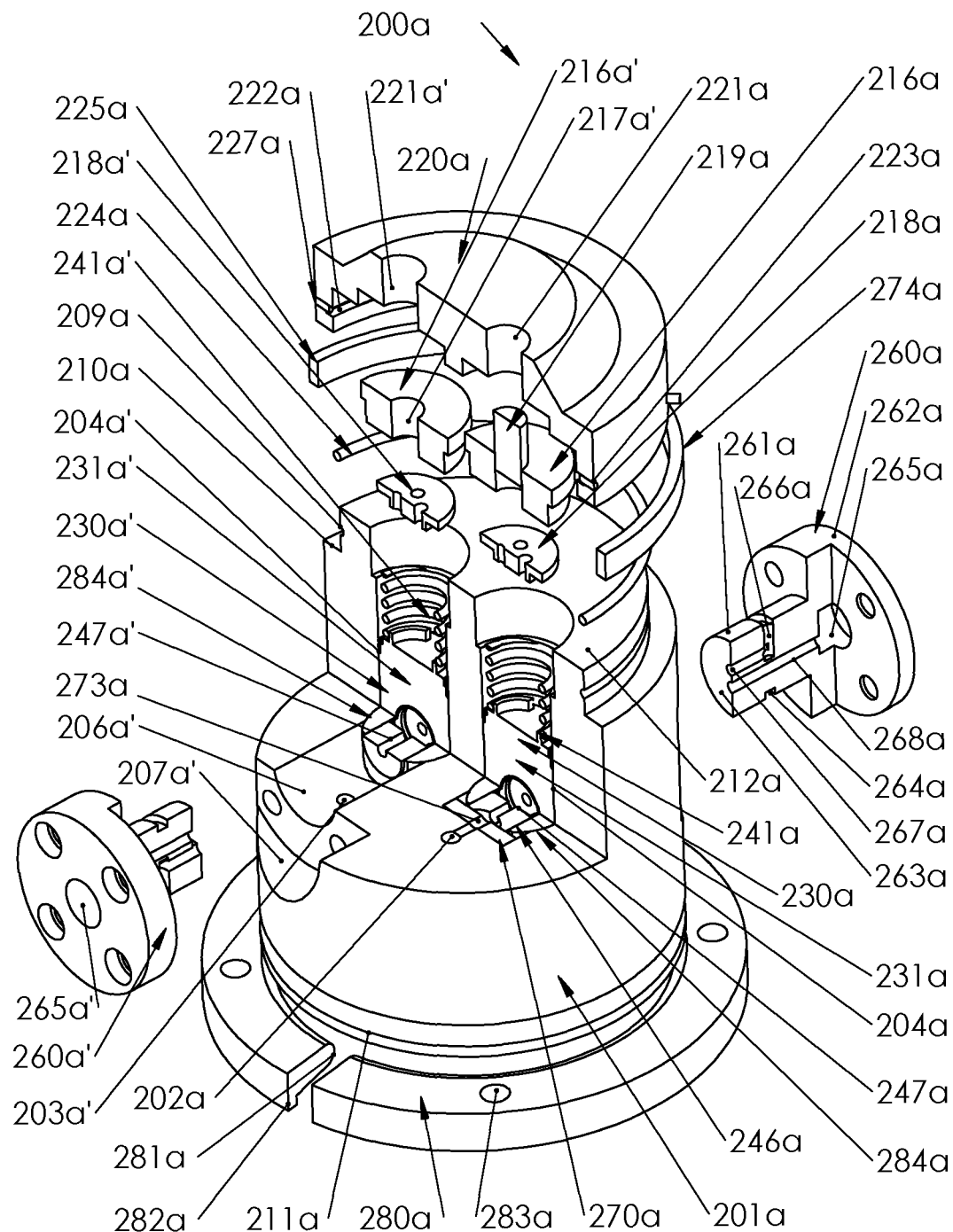

FIG. 1 is an exploded, tripe cut view of a pressure protection subsystem constructed in accordance with this invention.
FIG. 2 is an exploded, quarter cut view of a pilot of FIG. 1.
FIG. 3 is a front view of valve of FIG. 1
FIG. 4 is a cross sectional view of valve of FIG. 3 along line A-A.
FIG. 5 is a cross sectional views of valve of FIG. 2 along line B-B.
FIG. 6 is a cross sectional view of valve of FIG. 5 along line C-C.
FIG. 7 is an "E" detail view of the valve of FIG. 6
FIG. 8 is a "D" detail view of in the valve of FIG. 5.
FIG. 9 is a "F" detail view of in the valve of FIG. 5.
FIG. 10 is a front view of pilot of FIG. 2.
FIG. 11 is an ISO view of pilot of FIG. 10
FIG. 12 is a cross sectional view of pilot of FIG. 10 along line A-A.
FIG. 13 is a cross sectional view of pilot of FIG. 10 along line B-B.
FIG. 14 is an "E" detail view of pilot of FIG. 12
FIG. 15 is a "F" and "G" detail views of pilot of FIG. 13
FIG. 16 is a front view of subsystem of FIG. 1
FIG. 17 is a cross sectional view of pilot of FIG. 16 along line J-J.
FIG. 18 is a cross sectional view of pilot of FIG. 16 along line K-K.
FIG. 19 is a cross sectional view of valve of FIG. 16 along line G-G
FIG. 20 is a "T" detail view of valve of FIG. 19

FIG. 21 is a "M" detail view of valve of FIG. 19
FIG. 22 is a "P" detail view of valve of FIG. 19
FIG. 23 is a "L" detail view of valve of FIG. 19
FIG. 24 is a side view of an alternative subsystem of FIG. 1
FIG. 25 is a cross sectional view of valve of FIG. 24 along line A-A.
FIG. 26 is a cross sectional view of pilot of FIG. 24 along line G-G.
FIG. 27 is a side view of an alternative subsystem of FIG. 1
FIG. 28 is a cross sectional view of valve of FIG. 27 along line H-H.
FIG. 29 is a cross sectional view of valve of FIG. 27 along line F-F.
FIG. 30 is a "K" detail view of valve of FIG. 25
FIG. 31 is a front view of an alternative subsystem of FIG. 1
FIG. 32 is a cross sectional view of valve of FIG. 31 along line K-K.
FIG. 33 is a cross sectional view of valve of FIG. 32 along line L-L.
FIG. 34 is a cross sectional view of pilot of FIG. 31 along line R-R.
FIG. 35 is a cross sectional view of pilot of FIG. 31 along line P-P.
FIG. 36 is a front view of an alternative subsystem of FIG. 1
FIG. 37 is a cross sectional view of valve of FIG. 36 along line F-F
FIG. 38 is a cross sectional view of valve of FIG. 37 along line J-J.
FIG. 39 is a cross sectional view of valve of FIG. 36 along line C-C.
FIG. 40 is a "J" detail view of valve of FIG. 39.
FIG. 41 is a cross sectional view of valve of FIG. 3G along line D-D.
FIG. 42 is a front view of an alternative subsystem of FIG. 1
FIG. 43 is a cross sectional view of valve of FIG. 42 along line B-B.
FIG. 44 is a cross sectional view of valve of FIG. 43 along line D-D.
FIG. 45 is a cross sectional view of pilot of FIG. 42 along line A-A.
FIG. 46 is a cross sectional view of pilot of FIG. 42 along line F-F.
FIG. 47 is a front view of an alternative pilot of FIG. 42
FIG. 48 is a cross sectional view of valve of FIG. 47 along line G-G.
FIG. 49 is a cross sectional view of valve of FIG. 47 along line H-H.
FIG. 50 is a ISO view of a pressure protection system constructed in accordance with this invention.
FIG. 51 is a front view of the system of FIG. 50
FIG. 52 is a cross sectional view of the system of FIG. 51 along line A-A.
FIG. 53 is a cross sectional view of the system of FIG. 51 along line B-B.
FIG. 54 is a "H" detail view of gate valve of FIG. 53.
FIG. 55 is a "E" detail view of gate valve of FIG. 52.
FIG. 56 is a "F" detail view of gate valve of FIG. 52.
FIG. 57 is a "L" detail view of gate valve of FIG. 52.

REFERENCE NUMBER IN DRAWING

10 Pressure protection system
20 Pressure relief valve Normal Closed
20a Gas/liquid Pilot
20b Gas/Gas pilot
20c Liquid/liquid Pilot
40 elbow assembly
41 elbow
42 step bore
43 boss
44 rotor hole
45 trim assembly
46 fin
47 step
48 gap
60 pipe line
61 elbow bore
100 Valve a, b, c, d, e, f,
101 body
102 Inlet a, b
103 Outlet, c
104 Internal housing
105 housing bore
106 ID
107 rib
108 front surface
109 seat pocket shoulder
110 seat pocket
111 groove bore with W teeth
112 groove
113 pocket port
114 release port
115 pocket hole
116 cavity
117 pocket
118 seal shoulder
119 OD forming step bore
120 OD lock bore
121 Seat pocket
122 position groove
123 side flange
124 seat groove
125 ID forming step bore
126 Boss with W teeth
127 snap ring groove
128 seat
129 ID lock bore
130 plug assembly
131 conical front plate
132 OD
133 step OD
134 nose hole
135 seat
136 groove
137 step
138 joint hole
139 cage
140 base ring
141 Front ID
142 groove
143 Step OD
144 OD surface
145 OD shoulder
146 seat lock Hole
147 bearing hole
148 holder
149 bottom slots
150 B-ring assembly a,b,c,d,e
151 engaged ring
152 Internal surface 153 External surface
154 C shape groove
155 C shape bump
156 Front end
157 Back end
158 multiple cylindrical rings
159 holes
161 Support ring
162 Internal surface
163 External surface
164 C shape groove
165 C shape bump
166 Front end
167 Back end
168 trim assembly
169 screw hole
170 snap ring fastener (setscrew or spring
171 pin)
172 seat
173 needle
174 gland
175 needle valve
176 rupture disc
177 ball bearing assembly
178 ball
179 spring
180 sensing valve
181 groove
182 middle wall
183 volume substitute box
184 solid head
185 hollow head
186 conical nose
187 radial hole
188 link hole
189 screen
190 unformed A ring
273 hole
274 top cover assembly
280 clamp
281 C shape lock ring
282 position leg
283 screw hole
284 shear seal assembly
191 OD
192 ID
193 Formed A ring
194 W teeth groove
194' Mated W teeth groove
195 adapter flange
196 spring
197 seal plug
198 boss
199 back plate
20 Pressure block valve Normal Open/between
20d Gas/liquid Pilot
20e Liquid/liquid Pilot
20f Liquid/liquid Pilot
49 front surface
50 pin hole
51 pin
52 elbow rotor assembly
53 rotor
54 shaft
55 blade
56 slot
57 screw
58 washer
59 cover
200 Pilot a,b,c,d,e,f,g
201 body
202 main passageway
203 link passageway
204 plug bore
205 plug step bore
206 seat bore
207 seat step bore
208 sense port
209 top groove
210 top step
211 bottom groove
212 top surface
213 pocket port
214 release port
215 bottom surface
216 plug cover
217 hole
218 spring gland
219 adjustable screw
220 top cover
221 top hole
222 groove
223 screw hole
224 snap ring
225 fixed ring
226 screw hole
227 setscrew
228 OD surface
229 hole
230 plug assembly
231 plug
232 front side
233 back side
234 front side OD
235 back side OD
236 front side step
237 front side shoulder
238 back side step
239 back side shoulder
240 seal bore
241 spring
242 front seal
243 hole
244 seal surface
245 corner seal surface
246 back seal
247 hole
248 seal surface
249 corner seal surface
250 B-ring assembly, a,b,c,
251 engaged ring
252 Internal surface
253 External surface
254 C shape groove
255 C shape bump
256 Front end
257 Back end
258
259 notch
260 seat cover
261 front piston
262 back plate
263 front surface
264 groove 265 inlet port
266 radial hole
267 link hole
268 main hole
269 link slot
270 base seal
271 front surface
272 back surface

DESCRIPTION

FIGS. 1-57 illustrate a pressure protection system 10 and subsystem 20 constructed in accordance with the present invention, the pressure protection subsystem 20 has six models 20a, 20b, 20c, 20d, 20e, 20f with six types of valves 100a, 100b, 100c, 100d, 100e, 100f and seven types of pilots 200a, 200b, 200c, 200d, 200e, 200f, 200g.

Referring FIGS. 1-23,50, the subsystem 20a has a valve 100a and a pilot 200a, the valve 100a comprises a body 101a and two side flanges 123a, 123a' connected with the body 101a on the right and left sides with two inlets 102a, 102a', the body 101a has an internal housing 104a connected with the body 101a by three ribs 107a, 107a', and 107a", three ribs 107a, 107a', 107a" are respectively expended to three extrenal bosses 198a, 198a' and 198a", two plug assemblies 130a, 130 are respectively movably positioned in the internal housing 104a in an opposite direction between closed and open positions, the normal positions of the plug assemblies 130a and 130a' are in the closed position, the valve 100a has two pockets 117a, 117a', pocket 117a is defined by a middle wall 182a and the plug assemblies 130a and internal housing 104a, pocket 117a' is defined by the middle wall 182a and the plug assemblies 130a and internal housing 104a, the pocket 117a, 117a' are respectively connected to two pocket ports 113a, 113a' into pocket holes 115a, 115a' through the ribs 107a, 107a, 107a", the valve 100a has a cavity passageway 116a between the internal housing 104a and the body 101a, between the body 101a and side flange 123a, between the body 101a and side flange 123a', the cavity 116a is expended to an outlet 103a, an inlet 102a is sealed out from the cavity 116a by B ring assembly 150d, an inlet 102a' is sealed out from the cavity 116a by B ring assembly 150c, the cavity 116a is connected to release port 114a, a pressure sensing valve 180a is provided for sensing a pressure of pocket 117a, a rupture disc 176a with a needle valve 176a is provided for pressure safety protection in case of overpressure fluid not releasing at presetting max pressure limit and for sealing after rupture disc 176a is ruptured, the pilot 200a has two pocket ports 213a, 213a' and a release ports 214a, two pocket ports 213a, 213a', release ports 214a are respectively connected to the pocket ports 113a, 113a' and release port 114a on the valve body 101a, and for control movements of the plug assemblies 130a, 130a', the pilot 200a functions as two independent three-ways/two position valves and has two plug assemblies 230a, 230a' to move between the two positions.

Referring FIGS. 1-6, Body 101 includes the outlet 103 connected to the cavity 116a and connected with an adapted flange 195a to a fluid tank (not shown), the internal housing 104a has two grooves 112a, 112a' in the right and left sides, the body 101a also the pocket hole 115a through the rib 107a to a boss 198a' and the pocket hole 115a' through the rib 107a' to the boss 198a', the pressure sensing valve 180a has a cylindrical seat ring 172a with an edge engaged with a conical needle 173a in a pocket hole 115a for open and closed operations, a holder 148a has four slots 149a at a bottom for supporting the seat 172a and releasing overpressure from the pocket 115a to cavity 116a, the needle 173a is biased by a gland 174a and spring 179a for sensing a fluid pressure in pocket 117a, the rupture disc 176a and a needle valve 175a are installed with the holder 148a' in pocket hole 115a', a holder 148a' has four slots 149a' at a bottom for supporting the rupture disc 176a and releasing overpressure from the pocket 115a' to cavity 116a, the needle valve 175a is used for sealing off the pocket 116a' after rapture disc 176a is raptured, the body 102a has a lock groove 181a.

Plug assembly 130a' is disposed in a left side of valve with functions of a gas pressure control, immediate sensing, tracking and has a solid head 184a and a front plate 131a and a base ring 140a, the sealed pocket 117a' is formed by the plug assembly 130a', the middle wall 182a and the internal housing 104a, the volume substitute box 183a constructed with the middle wall 182a is used for reducing the pocket 117a' volume and the temperature effect and as a heat reservoir filled with liquids for averaging today and night time temperatures and reducing gas consumption.

Referring FIGS. 6-7, plug assembly 130a is disposed in a right side of valve with functions of a liquid pressure control and immediate sensing, tracking and has a hollow head 185a and a front plate 131a and a base ring 140a, the pocket 117a is formed by the plug assembly 130a, the middle wall 182a and the internal housing 104a, the head 185a has a conical front 186a and three radial holes 187a extended to an axial hole 188a for communicating and creating a pressure difference between a fluid in the inlet 102 and a fluid in the pocket 117a, a screen 189a is placed outside head 185a for slurry fluid applications, the head 185a has two functions (1) when the pressure sensing valve 180a starts to open and release into pocket hole 115a, the pressure in the pocket 117a start to drop and through hole 188a as well, head 185 will increase the pressure drop even bigger (2) when the pressure difference between the pocket 117a and inlet 102 become so big, the pressurized fluids in inlet 102a is to push the plug assembly 130a inwardly with full piston effect and full front area of the front plate 131a, because of no front open holes in the head 185a and front plate 240a, the fluid in the pocket 117a would pour out through two ways (a) pocket hole 115a and (b) head radial holes 187a, the relief streams of fluid through the head 185a release radially and to help the main fluids in inlet 102a even faster to release into the cavity 116a as the plug assembly 130a moves away from the closed position, the full piston effect creates the faster pressure relief than any existing pressure relief mechanism in comparison with the conventional relief valve with reduced piston areas due to open axial holes, the front plate 131a has a conical surface and a step bore 133a and four radial fastener holes 138a on the back side, the base ring 140a has four bearing holes 147a equally spanned on an outside diameter surface 144a respectively to receive four ball bearing assemblies 177 for supporting and balancing the plug assembly 130a and reducing moving frictions of the plug assembly 130a, the ball bearing assembly 177 has a ball 178 biased by spring 179, the ball bearing assembly 177 is positioned over the groove 112a for stabilizing the plug assembly 130a at full open position for normal open applications and reducing speed of the plug assembly 130a and preventing secondary pressure surge as the plug assembly 130a is too fast to be closed for normal closed applications.

Referring FIG. 6-8, a B ring (after Bump and Buckling) assembly 150a for providing dynamic seals under buckling condition between the cavity 116a and base ring 140a' is positioned in the left side of the body 101a, the B ring assembly 150a is disposed in a seat pocket 110a of Internal housing 104a and has an engaged ring 151a and a support ring 161a, the engaged ring 151a has an inside diameter surface 152a, an outside diameter surface 153a, a conical front end 156a and a conical back end 157a, the support ring 161 has an inside diameter surface 162a, an outside diameter surface 163a, a conical front end 166a and a conical back end 167a, the engaged ring 151a inserted into ring 161a with a fit is rolled together for creating a C shape groove 154a, a C shape bump 155a on the engaged ring 151a and a C shape groove 164a, a C shape bump 165a on the support ring 161a, two sets of B ring assemblies 150a in series are disposed in seat pocket 110a, the C bump 155a is engaged with the surface 144a' for creating initial contact seal force at a presetting pressure on a surface 144a' of base ring 140a', the B ring 151a with front end 156a and 161a with front end 166a are engaged with a conical pocket shoulder 109a for providing supports and seals, the outside diameter surface 163a of support ring 161a is engaged with the seat pocket 110a for seals, the C groove 164a is engaged with a snap ring 170a, four fasteners 171a are respectively fastener holes in the holes 169a to push the snap ring 170a and B ring 150a for creating a buckling condition at the C shape bump 155a between front end 156a and the C shape groove 154a and a buckling condition at the C shape bump 165a between front end 166a and the C shape groove 164a for increasing further contact seal force, between the C shape bump 155a and the surface 144a' at a working seal pressure.

Referring FIGS. 6-9, plug assembly 130a and a B ring assembly 150b are provided with dynamic seals between the cavity 116a and the base ring 140a, B ring assembly 150b has an engaged ring 151b and a support ring 161b, the engaged ring 151b has an inside diameter surface 152b, an outside diameter surface 153b, a conical front end 156b and a flat back end 157b, the support ring 161b has an inside diameter surface 162b, an outside diameter surface 163b, a conical front end 166b and a flat back end 167b, ring 161b inserted into ring 151b is rolled together for creating a C shape groove 154b, a C shape bump 155b on ring 151b and a C shape groove 164b, a C shape bump 165b on the ring 161b, the C shape bump 155b is engaged with the surface 105a for an initial seal contract force between the internal housing 104a and a base ring 140a, the engaged ring 151b with the front end 156b against a conical pocket shoulder 145a for supporting and creating an initial seal contact force between the C shape bump and the surface 105a at a presetting seal pressure, support ring 161b is engaged with the seat pocket 145a for seals, the inside diameter surface 162b of ring 161b is engaged with a conical surface of 143a for seals, fasteners 171b (setscrews or pins) are inserted in the hole 144a to push the ring 161b and create a buckling condition at the C shape bump 155b between front end 156b and the C shape bump 154b for increasing further contact seal force between the C shape bump 155b and the surface 105a at a working seal pressure.

Referring FIGS. 2, 12, 13, the pilot 200a is a dual three-way/two position valve, pilot 200a has a cylindrical body 201a, a pair of plug assemblies 230a, 230a' and a pair of seat covers 260a, 260a' and a pair of base seals 270a, 270a', a pair of plug covers 216a, 216a' and a top cover assembly 274a and clamp 280a, the body 201a has two vertical plug bores 204a, 204a' from a top surface 212a, bores 204a, 204a' respectively have step bores 205a, 205a' and to receive plug assemblies 230a, 230a', the body 201a has two horizontal seat bores 206a, 206a', seat bores 206a, 206a' are respectively expended to the bores 207a, 207a) and respectively to receive seat covers 260a, 260a', the body 201a has two main passageways 202a, 202a' and two link passageways 203a, 203a' from a bottom surface 215a, two main passageways 202a, 202a' are respectively expended to pocket ports 213a, 213a' and seat bores 206a, 206a', seat covers 260a, 260a' respectively are positioned in seat bores 206a, 206a' and have front pistons 261a, 261a' and back plates 262a, 262a', front pistons 261a, 261a' respectively have inlet ports 265a, 265a' expended to main holes 268a, 268a', the pistons 261a, 261a' respectively have seal surfaces 263a, 263a' and link holes 267a, 267a' expended to radial hole 266a, 266a', front pistons 261a, 261a' respectively have grooves 264a, 264a' connected to the radial holes 266a, 266a', plug assemblies 230a, 230a' are respectively positioned in the plug bores 204a, 204a' and plug step bores 205a, 205a' and are biased by springs 241a, 241a' and spring glands 218a, 218a', the plug bores 204a, 204a' are respectively covered by plug covers 216a, 216a, plug covers 216a, 216a' respectively have holes 217a, 217a', top cover assembly 274a has a top cover 220a, fixed ring 225a, snap ring 224a and eight setscrews 227a, top cover 220a placed on plug covers 216a, 216a' has bores 221a, 221a' respectively to aligned with holes 217a, 217a' and a groove 222a and eight threaded holes 223a equally located on an outside diameter surface 228a of the top cover 220a and expended to the groove 222a, the body 201a has a step 210a with a cyclical groove 209a, the snap ring 224a is placed between the groove of 222a and groove 209a, each of four setscrew 227a is threaded in each of four holes 223s in the top cover 223a to press the snap ring 224a into the groove 209a of the body 201a, a fixed ring 225a is placed on the top cover 220a to prevent the setscrew 227a from falling out and has four holes 229a respectively aligned up with four holes 223s without the setscrew 223 to block the setscrew 227a, each of four setscrew 227a is respectively threaded through holes 229a into thread holes 223a for securing a joint between fixed ring 225a and the top cover 220a, each of base seals 270a, 270a' has one of holes 273a, 273a', one of front seal surfaces 271a, 271a', one of back seal surfaces 272a, 272a', the plug assemblies 230a, 230a' respectively have plugs 231a, 231a' and shear seal assemblies 284a, 284a', shear seal assemblies 284a, 284a' respectively have front seal plates 242a, 242a', B rings 250a, 250a' and back seal plates 246a, 246a', shear seal assemblies 284a, 284a' respectively are disposed in seal radial bores 240a, 240a' and are against surfaces 264a, 264a' and surfaces 248a, 248a' for seals, the clamp 280a has a lock ring 281a and leg 282a with two sections, the clamp 280a is placed between groove 211a on pilot 200a and a groove 181a on the valve 200a for securing a joint, leg 282a has a fit with groove 181a, if the joint is permanent, the inference fit will be used, if the joint is a semi-permanent joint or for high vibration applications, the transitional fit will be used, the joint method replaces the conventional long through screw joint with benefit of redundancy of joint, less machining and high structure integrity, because of the clamp structure, the clamp 280a still has flexibility like long screw, bolts (not shown) are used for securing the joint between valve 100a and pilot 200a.

Pilot 200a has the pocket port 213a, release port 214a respectively connected to the pocket port 113a and release port 114a on the valve 100a for the liquid pressure control pressure track and pressure sensing, a distance sensing fluid from the upstream overpressure zone about 10 to 20 times diameter pipe away is connected to port 208a, a pressure fluid from the upstream fluid zone is connected to the inlet port 265a, the inlet port 265a is connected to main passageway 202a through holes 268a, 243a, 247a, and B ring 250a of seat assembly 284a, plug assembly 230a disposed in the plug bore 202a, the plug assembly 230a is biased by spring 241a at a lower position as a pressure in the sensing port 208a is lower than a presetting pressure, a pocket port 213a is connected with main passageway 202a.

Pilot 200a has the blocked release port 214a, the pocket port 213a' is connected to port 114a on the valve 100a for the gas pressure control, pressure track and pressure sensing, a regulated gas is connected to hole 217a' for a presetting pressure against a pressure in the sensing port 208a', the regulated gas in hole 217a' is connected to main passageway 202a' through passageway 203a', groove 264a' and holes 266a', 267a', 247a' 243a', main passageway 202a' is connected to port 213a', the inlet port 265a' is as a release port, as the plug assembly 230a is biased by spring 241a' and the regulated gas is at a lower position, as a pressure in the sensing port 208a is lower than a presetting pressure due to force of spring 214a and a difference area between plug bore 204a' and plug step bore 205a', a pocket port 213a is connected with main passageway 202a.

Referring FIGS. 14 to 15, Plug assembly 230a is assembled with shear seal assembly 284a, the shear seal assembly 284a has the front seat 242a, back seat 246a and B ring 250a, front seat 242a has a flat seal surface 244a and an edge seal fillet 245a, back seat 246a has an edge seal fillet 249a and a flat seal surface 248a, B ring 250a has an engaged ring 251a, the engaged ring 251a has an inside diameter surface 252b, an outside diameter surface 253a, a conical front end 256a and a conical back end 257a ring 251a is rolled for creating C shape groove 254b, a C shape bump 255b, the C shape bump 255a is engaged with the surface 240a with a non-inference fit, B ring 250a is placed between front seat 242a and back seat 246a for creating a buckling condition at the C shape bump 255a under compression between front seat 242a and back seat 246a, the front end 256a is engaged with the corner 249a for seals between B ring 250a and back seat 246a, while the back end 257a is engaged with the corner 245a for seals between B ring 250a and front seat 242a. Plug assembly 230a has a plug 231a' and B ring 250b, the plug 231a' has a step bore 236a' expended to a shoulder 236a', B ring 250b has an engaged ring 251b, the engaged ring 251b has an inside diameter surface 252b, an outside diameter surface 253b, a conical front end 256b and a "L" back end 257b, ring 251b is rolled for creating a C shape groove 254b, a C shape bump 255b, the engaged ring 251b placed in step bore 236a' has the front end 256b against shoulder 236a' for supporting and creating an initial seal contact force between the C shape bump 255b and the surface 204a' at a presetting seal pressure, a lock ring 258b with a slot placed in step 236a with a press fit is forced to push ring 251b for creating a buckling condition at a C shape groove 254b and C shape bump 255b for increasing further contact seal force between the C shape bump 255b and the surface 204a' at a working seal pressure, the slot can be broken for replacement of new B ring 250b, an engaged ring 250C is the same as 250b.

Referring FIGS. 16,17,18,19, the plug assembly 230a in pilot 200a move up due to the increased pressure in sensing port 208a, the pocket port 213a is connected to release port 214a through main passageway 202a', shear seal assembly 284a, hole 267a and passageway 203a, the plug assembly 130a moves away from a closed position, the plug assembly 230a' in pilot 200a moves up due to the pressure in sensing port 208a' increase over a presetting pressure, the pocket port 213a' is connected to release port 265a' through main passageway 202a', shear seal assembly 284a', hole 268a', the gas pressure from pocket port 213a' is increased over the limit by at least 10% due to temperature change not working pressure change, especially in summer between the day and night time, this pressure release method only release the hottest portion of gas from the pocket 117a', while the conventional method is to release the gas outside the valve and between the valve and a gas storage so those gases which are not hot hut high pressure in the gas storage are released, the conventional method wastes 30% of regulated, pressurized gas in comparison with this method.

Referring FIG. 20, the plug assembly 130a has a front plate 131a, a base ring 140a and four fasteners 171a, the front plate 131a has a step bore 133a and four holes 138a, base ring 140a has a groove 142a and a conical bore 141a engaged with the mating step bore 133a of front plate 131a, four fastener 117a (setscrews or pins) are respectively inserted in the holes 138a into the groove 142a for securing a repairable joint between the front plate 131a and base ring 140a, four fastener 117a (spring pins) can be used for securing a permanent join between the front plate 131a and base ring 140a.

Referring FIG. 21, plug assembly 130a' and B ring assembly 150c are provided with seals between the side flange 123a' and front plate 131a' in the left side of the body 101a, the side flange 123a' has a snap ring groove 127a' with four fastener 171a, the B ring assembly 150c is disposed in a seat pocket 121a' of side flange 123a' and has an engaged ring 151c and a support ring 161c the engaged ring 151c has an inside diameter surface 152c, an outside diameter surface 153c, a conical front end 156c and a "L" back end 157c, the support ring 161c has an inside diameter surface 162c, an outside diameter surface 163c, a conical front end 166c and a flat back end 167c, ring 151c inserted into ring 161c with a fit is rolled together for creating a C shape groove 154c, a C shape Bump 155c on engaged ring 151c and a C shape groove 164c, a C shape bump 165c on the support ring 161c, the C shape bump 155c has a clearance fit with seat 135a', when the plug assembly 130a' is approached to the seat 135a', support ring 161c with a longer front end 166c first is engaged with a conical pocket shoulder 137a' for absorbing closing impact forces and creating a buckling condition to force C shape bump 155c to move outward for providing seals between front end 166c and shoulder 137a', then the engaged ring 151c with front end 156c is engaged with conical pocket shoulder 137a' for absorbing closing impact forces and creating a buckling condition to force C shape bump 155 to engaged with seat 135a' at a presetting working pressure, the outside diameter surface 163c of support ring 161a is engaged with the seat pocket 110a for seals, a snap ring 170a is placed in the groove 127a', four fasteners 171a are to push the snap ring 170a to engaged with the C shape groove 164c of ring 161c for securing a joint between the B ring 150c and seat pocket 121a'.

Referring FIG. 22, plug assembly 130a and a B ring assembly 150d are provided with seals between the side flange 123a and the front plate 131a, B ring assembly 150d has an engaged ring 151d and a support ring 161d, the engaged ring 151d has an inside diameter surface 152d, an outside diameter surface 153d, a conical front end 156d and a "L" back end 157d, the support ring 161d has an inside diameter surface 162d, an outside diameter surface 163d, a conical front end 166d and a flat back end 167d, support ring 161d inserted into engaged ring 151d is rolled together for creating a C shape groove 154c, a C shape bump 155d on engaged ring 151d and a C shape groove 164d, a C shape bump 165d on the support ring 161d, the C shape bump 155d has a clearance fit with seat 118a, when the plug assembly 130a is approached to the seat 118a, support ring 161d with a longer front end 166d is engaged first with a conical pocket shoulder 128a for absorbing closing impact forces and creating a buckling condition to force C shape bump 155d to move outward for providing seal between front end 166*d* and shoulder 128*a*, then the engaged ring 151*d* with front end 156*d* is engaged with conical pocket shoulder 128*a* for absorbing impact forces and creating a bucking condition to force C shape bump 155*d* to engaged with seat 118*a* at a presetting working pressure, the outside diameter surface 153*d* of ring 151*d* is engaged with a step of front plate 131*a*, the "L" back end 157*d* is locked in step 137*a* for securing a joint between the ring 150*c* and plug assembly 130*a*.

Referring to FIG. 23, a formed A ring 193*a* is placed between body 101*a* and side flange 123*a*, the body 101*a* has W shape teeth 111*a* with an angle between 75 to 105 degree in a lock conical bore 120*a* and an outside diameter forming step bore 119*a*, the side flange 123*a* has a mating boss 126*a* with mated W teeth and a conical lock bore 129 *a* and inside diameter forming step bore 125*a*, a unformed 190*a* has an outside diameter 192*a* placed in the forming step bore 119*a* and an inside diameter surface 192*a* placed in the inside diameter forming step bore 125*a*, after body 101 and said flange 123*a* are compressed, the unformed 190*a* becomes A formed ring 193*a* with W shape, the inside diameter surface 192*a* is attached to lock bore 129*a* and the outside diameter 191*a* is attached to lock bore 120*a*, there are other two unformed A rings 190*a'* and 190*a'*, A ring 190*a'* has only inside diameter 192*a'* attached to lock bore 129*a*, A ring 190*a"* has only outside diameter 191*a"* attached to lock bore 120*a*, the attached A ring 190*a* is provided with robust seal solution even when the subsystem under water hammer and temporal axial flange separation, so far there is no attachable seal ring in use to solve the operation problem.

Referring to FIGS. 24-30, the subsystem 20*b* based on subsystem 20*a* comprises valve 100*b* and pilot 200*b*, the valve 100*b* has two plug assemblies 130*b*, 103*b* for two gas pressure controls, two pressure tracking and two pressure relief, the subsystem 20*c* based on subsystem 20*a* comprises valve 100*c* and pilot 200*c*, a valve 100*c* based on valve 100*a* comprises two plug assemblies 130*c*, 103*c* for two liquid pressure control, two pressure tracking and two pressure relief, B ring 150*e* is placed in grooves 194*b* and 194*b'*, each groove 194*b*, 194*b* have respectively bottom fillets and corners chamber, B ring 150*e* has an engaged ring 151*e*, the engaged ring 151*e* has an inside diameter surface 152*e*, an outside diameter surface 153*e*, a conical front end 156*e* and a conical back end 157*e*, ring 151*e* is rolled for creating a C shape groove 154*e*, a C shape bump 155*e*, the C shape bump 155*e* is engaged with the chamfers both grooves 194*b*, 194*b'*, the both ends 157*e*, 156*e* are respectively engaged with two chamfers of grooves 194*b*, 194*b'* under a buckling condition.

Referring to FIGS. 31 to 35, the subsystem 20*d* based on subsystem 20*a* has a valve 100*d* and pilot 200*d*, the valve 200*d* comprises two plug assemblies 130*d*, 103*d'* for blocking off, the valve 100*d* has one inlet 102*d* and one outlet 103*d* and a blind flange 195*d*, two release ports 114*d*, 114*d'* are blocked, the pocket ports 113*d*, 113*d* are open and respectively connected to pocket ports 213*d* and 213*d'* on the pilot 200*d* for gas or liquid pressure controls, the plug assembly 130*d'* is located on a side of an inlet 102*d* and sealed off by a head 184*d'* and biased by a spring 196*d'* at a normal open position, the plug assembly 130*d* is located on a side of an outlet 102*d* and sealed off by a head 184*d* at a normal open position, the head 184*d* is connected with a back plate 199*d* in a spring cage 139*d*, the spring cage 139*d* holds spring 199*d* for pushing plug assemble 130*d* inwardly and is trend to open, the cage 139*d* is secured with the middle wall 182*d* with bolts (not shown), pilot 200*d* has pocket ports 213*d*, 213*d'* and release port 214*d*, release ports 114*d*, 114*d'* are blocked, the pocket ports 213*d*, 213*d'* are open and respectively connected to pocket ports 113*d*, 113*d* on the valve 100*d*, the sensing fluid comes into ports 208*d*, 208*d'* and against the plug assembly 230*d* and 203*d'*, the fluid in the pockets 117*d*, 117*d'* are respectively connected respectively to ports 202*d*, 202*d'* through ports 213*d*, 213*d'*, when a fluid pressure rises in the ports of 208*d* or 208*d'*, the plug assembly 230*d* will move up and connect port 268*d* to 202*d*, port 268*d* is connected actuation fluid (not shown), the plug assembly 230*d'* will move up and connect port 268*d'* to 202*d'*, then the plug assembly 130*d* and 130*d'* in valve 100*d* will move to closed positions.

Referring to FIGS. 36-41, a subsystem 20*e* based on subsystem 20*d* comprise a valve 100*e* and pilot 200*e*, valve 100*e* comprises two plug assemblies 130*e*, 103*e'* for pressure regulation applications, two release ports 114*e*, 114*e'* are open and respectively connected with release ports 214*e* and 214*e'* on pilot 200*e*, the pocket ports 113*e*, 113*e* are open and respectively connected with pocket ports 213*e* and 213*e'* on the pilot 200*e*, the plug assembly 130*e'* is located on a side of an inlet 102*e*, the plug assembly 130*e'* is located on a side of an outlet 102*e*, pilot 200*e* has pocket ports 213*e*, 213*e'* and release ports 214*e*, 214*e'*, release ports 214*e*, 214*de'* are open and respectively connected to pocket ports 114*ed*, 114*e'* on the valve 100*e*, the pocket ports 213*e*, 213*e'* are open and respectively connected with pocket ports 113*e*, 113*e* on the valve 100*e*, sensing fluids come into ports 208*e*, 208*e'* and against the plug assemblies 230*e* and 230*e'*, the pockets 117*e*, 117*e'* are respectively connected to ports 202*e*, 202*e'*, the plug assembly 230*e'* is disposed in plug bore 204*e* with a spring 241*e'*, a pressurized fluid is constantly connected to ports 267*e'* and 268*e* by a slot 269*e* for regulating the pressurized fluid at a smaller step but more frequency, seat cover 260*e'* has a slot 269*e'* for communication between hole 268*e'* and 267*e'*, the slot 269*e'* is constructed by three profiles, flat, comical and spherical, while the plug assembly 230*e* without a slot is disposed in plug bore 204*e* with a spring 241*e*, a pressurized fluid is constantly connected to ports 268*e*, 268*e'*, ports 267*e* is connected to passageway 203*e* to release, so plug assembly 230*e'* acts as a control valve but moves fast with small changes, while plug assembly 230*e* acts as an on-off valve and move slow with large changes such a combination create the best dynamic and static performances with fast response but stable output fluid, no single pressure regulator can have such performance, plug assembly 130*e'* has a conical front plate 131*e'* on the outlet 103*e*, the conical front plate 131*e'* has a dynamic trim 168*e* the trim 168*e* has multiple coaxial cylindrical rings 158*e'* with multiple horizontal holes 159*e'* for controlling a relief fluid pressure drop above a vapor pressure and preventing cavitation, such a dynamic trim 168*e* not only control cavitation very effectively at small opening where the most cavitations happen, but also open the fluid area when the plug assembly 130*e'* at an open position and does not reduce the flow capacity unlike conventional static trim, the trim can be constructed as welding part or as an integral part with the front plate 131*e*.

Referring to FIGS. 42-46, a subsystem 20*f* based on subsystem 20*e* comprises a valve 100*f* and pilot 200*f*, the valve 100*f* comprises two plug assemblies 130*f*, 130*f'* for pressure regulation applications, the two release ports 114*f*, 114*f'* are blocked, the pocket ports 113*f*, 113*f* are open and respectively connected with pocket ports 213*f* and 213*f'* of pilot 200*f*, the pocket ports 213*d*, 213*d'* are open and respectively connected with pocket ports 113*f*, 113*f'* on the main valve 100*f*, fluids in sensing ports 208*f*, 208*f'* are respectively connected to ports 213g, 213g' and are against the plug assembly 230f and 230f', the pockets 117f, 117f' are respectively connected respectively with ports 202f, 202f' through the pocket ports 113f, 113f, the plug assembly 230f is disposed in plug bore 204f with a strong spring 241f, a pressurized fluid is constantly connected to port 268f by a slot 269e for regulating the pressurized fluid at a larger step but less frequency, the slot 269e' is constructed by three profiles, flat, comical and spherical, while the plug assembly 208e is disposed in plug bore 234e' with a weak spring 241f for regulating the pressurized fluid at a smaller step but high frequency, such a combination creates the best dynamic and static performances with fast response but stable output fluid, no single pressure regulator can have such performances.

Referring to FIGS. 47-49, a pilot 200g based on 200f has two plug assemblies 230g, 230g', both pocket ports 213dg, 213g' and release ports 214g, 214g' are open and for receiving and releasing fluids as an independent pilot, both pocket ports 213g, 213g' are respectively connected to sensing ports 208g, 208g', the valve 200g acts as two pressure regulators, a pressurized fluid through 265g and 268g port is connected to port 243g at a low pressure, when a fluid pressure in port 213g increases, the plug assembly 230g will move up, the port 243g will connected to 267g to release the overpressure fluid, when a fluid pressure in port 213g decreases, the plug assembly 230g will move down, the port 243g will connected to 268g to receive the pressurized fluid and increases the fluid pressure in port 213g, because of the slots 269e, the pressure change is seamless and stable for precision control applications.

FIGS. 50-57 illustrate a hybrid pressure protection system 10 constructed in accordance with the present invention, the system 10 includes one of subsystems 20e for isolating over-pressurized fluid at a normal open position, one of subsystems 20a, 20b, 20c for releasing over-pressurized fluid at a normal closed position and subsystem 20f, 20g for both applications and a pipe 60 and two elbow assemblies 40 for connections from an over pressurized fluid to the pressure protection subsystems 20, the elbow assembly 40 has elbow 41, a rotor assembly 52 and a pair of trims 45, 45' and a pair of pins 51, the elbow 41 has two step bores 42 on each of ends of elbow 41 and a boss 43 with rotor bore 44 on an outward side of a middle of the elbow 41 at 45 degree section, each step bore 42 has a pin hole 50, trims 45 has three fins, 46, 46a, 46b with two gaps 47, 47a and three surfaces 46, 46a and 46b defined by one of prolife a conical and spherical surface, the trim 45 has a step 47 with a hole 50a engaged with the bore 42 for reducing turbulent fluid and erosion in the outward wall of elbow 41 to average the fluid pressure gradient in the elbow 41 when the system 10 start to release an over-pressurized fluid, the pin 51 is inserted through hole 50 and hole 50a for securing the trim 45 with the elbow 41. Trim 45' has fins, 46', 46a', 46b' and step 47', the rotor assembly 52 is disposed in bore 61 for mixing a high speed fluid stream in the outward wall of the elbow 41 and a slow speed fluid stream in an inward wall of the elbow 41 and reducing the erosion on the outward wall of elbow 41, The rotor assembly 52 has a rotor 53, the rotor 54 has three blade 55, 55', 55", blade 55 has a slot 56, so when a fluid passes the elbow 41 and force the rotor 53 to rotate, the unbalanced rotor 53 will generate a unbalanced rotation and a designed vibration, as the erosions on the elbow 41 and rotor 54 progress, so does the vibration features, so the level of erosion can be detected and monitored and predicted by a vibration sensor, one of blade 55, 55'55' are made out of a magnetic material, so an unbalanced rotation can be detected and monitored by a magnetic sensor, those two data will enhance the reliability of the data and accuracy of the predication of erosion and timing of replacement, they can be used undersea and underground pipelines.

CONCLUSIONS

The present invention provides a long sought solution—an inherent high integrity pressure protection system instead of a combination of conventional low integrity pressure protection devices, the solution is (1) actuator-less, without external actuators, the valve has no actuator joint failure, no additional pipe leak, piston leak and joint leak, no piston sticking, no unbalanced force, no force or energy loss on frication or motion conversion (2) stem-less, the valve has no stem leak issue, no joint broken and no installation issue, especially in subsea, the installation between the valve and actuator are very difficult (3) both blocking overpressure fluid into normal pressure zone and releasing overpressure fluid into low pressure zone, greatly reducing total shut off time or impact time, risk of water hamper damage or pressure surge in normal pressure zone, rather than the old response time, which is meaningless (4) by nature, the plug valve has the least volume replacement over all valves with a travel about ¼ of diameter, in blocking side, the back plug assembly is much faster to close than other conventional valves due to less fluid resistance with the same moving direction, secondly a combination of the immediate sensing and releasing and a distant sensing and releasing, for the first time, pilot load liquid pressure control with the pressure sensing valve, pocket pressure drop effect and full area piston effect can match with gas loaded pressure control in term of full relief time (4) redundancy, inherent redundancy include (a) the left and right plug assemblies in the valve (b) the left and right plug assemblies in the pilot (c) external and Internal actuation energies (d) gas and pilot loaded controls (e) immediate sensing and a distinct sensing (f) destructive and nondestructive pressure protection methods The present invention discloses other breakthrough achievement—A Metal B ring, the metal B ring comprises the engaged ring and support ring for both static and dynamic seals applications, for the first time, metal seal for high speech impact seal because when the plug moves at speech of 00 ft./s to a closed position, most metal seal will deform and cause leaks, so no metal seal can survive at the speed 80 ft./s even with high flexible spring metal, the B ring is based on pipe buckling mechanism, which most engineers in the field would avoid, but here B ring can survive because of the buckling condition, the seal compression stress stays away below the yield strength of the materials, moreover B ring has the seals in both axial and radial seal areas and more support points to reduce stress value than any other seal rings, other is critical element for the invention is the rolling process, the rolling process not only creates the C shape groove and bump, but also strengthen material of the B ring by 30% due to the surface hardening, the joint between the engaged ring and the support ring under the buckling absorb the most of impact force without damage as a spring and heat dissipation through contact frictions, even the 316 stainless steel can be used for most applications, moreover the multiple B rings can be installed in a series, in short first B ring assembly also has capacities for axial and radial seals, no other all existing sealing device can provide, second it breaks the temperature limit from −250 to 1500 F, third it provides a dynamic seal under high temperature and high pressure, fourth it will last from 5 to 30 years without any replacement under high temperature, while non-metal seal material will deteriorate or age under sever service, so the applications with B ring will be quick pipe joint seals, subsea flow control systems for 25 years life time or, nuclear power plant for 60 years life time, or jet engines control valve or check valve with quick closed impact for millions cycles without replacement or failure.

The dual plugs in pilot is a heart of this invention if the two plugs in the valve act as the muscle, first the fully metal shear seal assembly is designed to shear off any buildup from dirty fluids between the seat cover and shear seal assembly during operation, second the B ring provides constant seals and spring force to push out the front and back seat against the seat cover and base seal for providing dynamic seals, instead of rubber O-rings and washer spring, second the novel porting structures with the axial port connected to release port through radial hole and a groove on one part of seat cover greatly reduce risk of leak and port block and part machining, third the slot between the through side port and axial port, greatly increase the function of the pilot for various applications, the slot includes multiple profiles, a flat, conical and spherical profiles, the most significant improvement is both plugs assembles not only work independently as two redundancies but act in a manner of synergy as a pressure regulator to produce both high dynamic performance—a fast response as pressure changes and static performances, stable pressure holding as pressure has no change with combinations of various springs and various slots, which no single regulator in any prior art can produces.

The full piston effect is a novel solution to the pilot operated system major problems—a slow response and inability to handle dirt fluids, the full piston effect is based on an optimal sold/liquid interaction mechanism on the plug with the combination of the direct sensing and the remote sensing, and the combination of direct release and indirect release, the full piston effect not only greatly increases the release speed of overpressure fluid, but also enhances sensibility for overpressure, sensing reliability and dirty fluid handling abilities with the shear seal assembly and the plug head screen.

The anti-cavitation plug trim in this invention provides a simple and effective way to reduce the cavitation without reducing the fluid capacity, the plug is constructed with multiple cylindrical rings on a conical front surface, each hole pass two layers of ring, so the fluid will pass the holes and change angle and move out along with the cylindrical ring, since the plug is movable, the flow condition can change any time unlike most fixed trim, it also can be used for water damping on dams or river or energy dissipating cone valve and terminal fluid control.

The elbow erosion control assembly is another innovation here, it provides a system solution not in in the prior arts, first the assembly provide a pair of fixed trim with multiple fins in the inlet and outlet of the elbow, the fastest fluid steam than ⅓ cross sectional area along with the outward wall of the elbow will divert to a middle stream and the slowest flow stream about ⅔ cross sectional area along with the inward wall of the elbow, second it provides a rotor assembly as dynamic trim to protect the outward wall of the elbow for dissipating some of energy of the faster fluid stream, and mix it with rest of streams, finally, the most important element is to monitor, detect and predict the erosion process, the rotor will create a designed, signature vibration profiles with an unbalanced blade as well as has one blade with a magnetic material Instead of avoiding vibrations, the unbalanced rotor not only create unbalanced rotation and vibration, but also a magnetic rotation signal, so both data will create critical data in regarding of erosion of the elbow as well as fluid conditions and are verifiable for a point of analysis, this device is very critical and useful tool for the pipelines underground, subsea or remote areas, where human access are difficult or impossible.

The A ring as an attachable ring between a pair of mated W shape teeth is other feature in this invention, the feature of seal attachablility is so critical for most flange connection in pumping or compression station, the pipeline, nuclear power or chemical plants, any sudden closing of pipeline valve or pump shutoff, vibrations or earthquakes would create water hammer or cause axial temporal or permanent separations of flange joints, the sudden separations generate million volatile gas or poison fluid leak every year around the world, so far there is no solution for axial temporal separation of flange joints, A ring is a simple but effective solution, it either can be attached to the outside diameter of A ring or the inside diameter of A ring, or both the inside diameter and outside diameter of A ring, the materials can be soft metal or polymer materials or composite materials or metal with polymer coating.

The volume substitute box is a great improvement in this gas loaded application, this not only reduces portion of pressurized fluid sensible to temperature swing effect, greatly improved the pressure sensing reliability due to gas temperature change reduction and gas consumptions, but also works as a heat reservoir filled with liquids or heat storable materials or fluids in the pipelines for averaging daytime and night time temperatures differences.

Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

I claim:
1. A fluid control system comprising:
   (a) A piping assembly having an inlet section and at least one outlet section
   (b) a hybrid pressure control assembly having at least one pressure releasing control subsystem and at least one pressure shutoff control subsystem, said subsystems have a valve, ports A, B, C, D and 1,2,3,4 and a pilot system connected with said valve by a means of said ports for operations between closed and open positions, said valve has a body assembly, a pair of left and right seat assemblies, a pair of left and right closure member assemblies movable positioned respectively between said body assembly and said seat assemblies, said body assembly has a body, a pair of side left and side right flange assemblies and an internal housing having at least three ribs respectively connected to said body, each of said side flange assemblies has a flange, said internal housing has a left cylindrical bore and a right cylindrical bore and a wall between said bores, said wall has one of plurality of types including a plate and the plate having at least one volume substitute box, the at least one volume substitute box has one of plurality of contents including gas, liquid and heat storable materials, said left cylindrical bore to receive said left closures member assembly for forming a left pocket, and said right cylindrical bore receive said right closure member assembly for forming a right pocket, said left bore has at least one left groove and said right bore has at least one right groove, said groove has a cross section defined by one of plurality of curves including a C curve and a V curve, said body is connected respectively with each of said side flange assemblies and said internal housing for forming a cavity, said body has said ports A, B, respectively connected to said right bore and said right pocket, and said left bore and said left pocket through one of the at least three ribs, said ports C, D respectively connected to said cavity, said ports 1, 2 are respectively connected to said ports A, B of said body, said ports 3, 4 are respectively connected to said ports C, D of said body, said body assembly has at least one spring pressure sensing valve installed in a through bore of one of the at least three ribs with passages to said cavity, and a rupture disc and a needle valve installed in a through bore of one of the at least three ribs with passages to said cavity, said body have at least one inlet port and at least one outlet port.

2. The fluid control system of claim 1, wherein at least one of said closure member assemblies has a front plate and a base ring having a lock groove and at least two radial ball bearing holes, and a head, said front plate has a center through hole to receive said head, a back step bore to receive said base ring and a back counter bore having multiple radial fastener holes, said front plate having radial and axial seal surfaces and a front surface defined by one of a plurality of profiles including a conical profile, a spherical profile and a conical profile having multiple concentric pipes, each of said pipes having multiple radial holes, the one of said closure member assemblies having multiple fasteners inserted respectively into said lock groove through said multiple radial fastener holes, said head has one of plurality of types including a solid head, the solid head having a spring holder, a head having a conical head having multiple radial holes extending to at least one axial hole and a step bore to receive a filter screen and a hollow body connected to the at least one axial hole, said closure member assembly having at least two ball/spring bearings placed respectively in the at least two radial ball bearing holes for controlling movements of said closure member assembly, the one of said closure member assemblies has one of plurality of configurations including (a) A gas loaded closure member assembly having said volume substitute box and said solid head (b) An internal liquid loaded closure member assembly having a hollow head and a spring (c) An internal liquid loaded front closure member assembly having said solid head and a spring (d) An internal liquid load back closure member assembly having said solid head having said spring holder and a caged spring (e) an internal liquid loaded back closure assembly having said solid head with said spring holder and a caged spring, and said front plate with said conical profile with said multiple concentric pipes.

3. The fluid control system of claim 1, wherein each of said seat assemblies has an engaged ring and at least one support ring and a locking assembly is placed among said flange, said internal housing and said closure member assembly for providing seals, said engaged ring has an internal surface defined by one of plurality of profiles including a conical profile and a cylindrical profile, an external surface defined by one of profiles including a conical profile and a cylindrical profile, a front end defined by one of plurality of profiles including a conical profile and spherical profile, and flat profile, a back end defined by one of plurality of profiles including a conical profile and spherical profile, flat profile, L shape profile, the at least one support ring has an internal surface defined by one of profiles including a conical profile and a cylindrical profile, an external surface defined by one of plurality of profiles including a conical profile and a cylindrical profile, a front end defined by one of plurality of profiles including a conical profile and spherical profile, flat profile, a back end defined by one of plurality of profiles including a conical profile and spherical profile, flat profile, L shape profile, the at least one support ring engaged with said engaged ring with a fit is rolled together is to form of least one groove having a C curve cross section and at least one bump having a C curve cross section for securing said engaged ring under buckling conditions, said locking assembly has one of plurality of structures including (a) a groove in one of said closure member assemblies expanding to multiple holes and a lock ring disposed in said groove and multiple screws respectively disposed in said holes to push said lock ring to secure said seat assembly with said closure member assembly (b) a groove in said flange expanding multiple holes and a lock ring disposed in said groove and multiple screws respectively disposed in said holes to push said lock ring and to secure said seat assembly with said flange (c) a groove in said housing expanding multiple holes and a lock ring disposed in said groove and multiple screws respectively disposed in said holes to push said lock ring to secure said seat assembly with said housing.

4. The fluid control system of claim 1, wherein said pilot system comprises a cylindrical body, a pair of left and right plug assemblies and a pair of seat covers, a pair of springs, said cylindrical body has a left vertical plug bore and a right vertical plug bore, a left horizontal seat bore extending to said left plug bore, a right horizontal seat bore extending to said right plug bore, each of said plug assemblies biased by one of said springs respectively movably positioned in one of said plug bores for forming a pressure pocket has a radial bore and a shear seal assembly, said shear seal assembly is movably positioned in said radial bore having a through hole, said shear seal assembly has a left metal seal ring with an edge surface and a right metal seal ring with an edge surface, a metal C ring biased by said edge surfaces between said seal rings for providing seals and spring functions, each of said seat covers positioned in one of said two horizontal seat bores has a back plate having a groove and a front piston having an axial hole extending to a radial hole connected to said groove linked to one of said release ports 3, 4 and a through side hole having one of plurality of profiles including said through side hole having a slot connected to said axial hole and said through side hole having no slot connected to said axial hole, said shear seal assembly having a back of said through port connected constantly to one of said main ports 1, 2 and a front of said through port against one of said two seat cover between said axial hole and said through side hole for controlling porting, said pressure pocket is connected by one of a plurality of pressure resources including an internal porting pressure and an external porting pressure, said hybrid pressure control assembly has a fluid/fluid loaded pressure porting system between said pilot system and said valve for establishing respectively control relationships between said plug assemblies of said valve and said plug assemblies of said pilot system.

5. The fluid control system of claim 1, wherein said piping assembly has at least one elbow and at least one elbow erosion control assembly having a rotor assembly and a pair of trim assemblies, the at least one elbow has a through bore and a front step bore having a position hole, a back step bore having a position hole, a rotor bore, each of said trim assemblies has a mated segmented cylindrical ring, and a mated segmented cylindrical step inserted respectively into said front step bore and said back step bore, a mated pinhole and a mated pin inserted respectively in said pinhole and said position hole for securing the each of said trim assemblies, the each of said trim assemblies respectively has at least two fins, inward surfaces of the at least two fins are defined by one of plurality of profiles including a conical profile and a spherical profile, said rotor assembly disposed in said rotor bore has at least two unbalanced blades for mixing fluid streams in said elbow and for generating unbalanced rotations and designed vibrations under fluid streams, one of the at least two unbalanced blades is made out of a magnetic material for generating a detectable vibration and well magnetic signals of said rotor and tracing and detecting levels of erosion on said elbow.

6. The fluid control system of claim 1, wherein said body assembly has at least one body seal assembly between said body and said flange, said body seal assembly has a left conical counter bore having multiple W shaped teeth, a right a conical stepped boss defined by mated multiple W shaped teeth and a flexible seal ring placed between said counter bore and said boss for providing seals between said flange and said body, said flexible ring has one of plurality of configurations including (a) Said flexible ring including a relatively larger inside diameter and a relatively larger outside diameter placed between said bore and said boss is pressed to form a W shape from an unformed shape and to fill gaps between said W shaped teeth and said mated W shaped teeth and attached to said bore (b) Said flexible ring including a relatively smaller inside diameter and a relatively smaller outside diameter placed between said bore and said boss is pressed to form a W shape from an unformed shape and to fill gaps between said W shaped teeth and said mated W shaped teeth and attached to said boss (c) said flexible ring including a relatively lager inside diameter and a relatively smaller outside diameter placed between said bore and said boss is pressed to form a W shape from an unformed shape and to fill gaps between said W shaped teeth and said mated W shaped teeth and respectively attached to said boss and said bore.

7. The fluid control system of claim 1, wherein said body assembly has one of plurality of structures including a three-piece body assembly and a two-pieces body assembly.

8. A valve has a body assembly, a pair of left and right seat assemblies, a pair of left and right closure member assemblies movable positioned respectively between said body assembly and said seat assemblies, said body assembly has a body, a pair of side left and right flange assemblies and an internal housing having at feast three ribs respectively connected to said body, each of said flanges assemblies has a flange, said internal housing has a left cylindrical bore and a right cylindrical bore and a wall between said bores, said wall has one of plurality of types including a plate and a plate having at least one volume substitute box, the at least one volume substitute box has one of plurality of contents including gas, liquid and heat storable materials, said left cylindrical bore to receive said left closures member assembly for forming a left pocket, and said right cylindrical bore receive said right closure member assembly for forming a right pocket, said left bore has at least one left groove and said right bore has at least one right groove, each of said grooves has a cross section defined by one of plurality of curves including a C curve and a V curve, said body is connected respectively with said left and right flange assemblies and said internal housing for forming a cavity, said body has ports A, B, respectively connected to said right bore and said right pocket, and said left bore and said left pocket through one of the at least three ribs, ports C, D respectively connected to said cavity, said body have at least one inlet port and one outlet port, said body assembly has at least one body seal assembly between said body and said flange, said body seal assembly has a left conical counter bore having multiple W shaped teeth, a right a conical stepped boss defined by mated multiple W shaped teeth and a flexible seal ring placed between said counter bore and said boss for providing seals between said flange and said body.

9. The valve of claim 8, wherein at least one of said closure member assemblies has a front plate and a base ring having a lock groove and at least two radial ball bearing holes, and a head, said front plate has a center through hole to receive said head, a back step bore to receive said base ring and a back counter bore having multiple radial fastener holes, said front plate having radial and axial seal surfaces and a front surface defined by one of a plurality profiles including a conical profile, a spherical profile and a conical profile having multiple concentric pipes, each of said pipes having multiple radial holes, the one of said closure member assemblies having multiple fasteners inserted respectively into said lock groove through said multiple radial fastener holes, said head has one of plurality of types including a solid head, a solid head having a spring holder, a head having a conical head having multiple radial holes extending to at least one axial hole and a step bore to receive a filter screen and a hollow body connected to the at least one axial hole, said closure member assembly having at least two ball/spring bearings placed respectively in the at least two radial ball bearing holes for controlling movements of said closure member assembly, the one of said closure member assemblies having one of plurality of configurations including (a) A gas loaded closure member assembly having said volume substitute box and said solid head (b) An internal liquid loaded closure member assembly having said hollow head and a spring (c) An internal liquid loaded front closure member assembly having said solid head and a spring (d) An internal liquid load back closure member assembly having said solid head having said spring holder and a caged spring (e) an internal liquid loaded back closure assembly having said solid head with said spring holder and a caged spring, and said front plate with said conical profile with said multiple concentric pipes.

10. The valve of claim 8, wherein each of said seat assemblies has an engaged ring and at least one support ring and a locking assembly is placed among said flange, said internal housing and said closure member assembly for providing seals, said engaged ring has an internal surface defined by one of plurality of profiles including a conical profile and a cylindrical profile, an external surface defined by one of profiles including a conical profile and a cylindrical profile, a front end defined by one of plurality of profiles including a conical profile and spherical profile, and flat profile, a back end defined by one of plurality of profiles including a conical profile and spherical profile, flat profile, L shape profile, the at least one support ring has an internal surface defined by one of profiles including a conical profile and a cylindrical profile, an external surface defined by one of plurality of profiles including a conical profile and a cylindrical profile, a front end defined by one of plurality of profiles including a conical profile and spherical profile, flat profile, a back end defined by one of plurality of profiles including a conical profile and spherical profile, flat profile, L shape profile, the at least one support ring engaged with said engaged ring with a fit is rolled together is to form at least one groove having a C curve cross section and at least one bump having a C curve cross section for securing said engaged ring under buckling conditions, said locking assembly has one of plurality of structures including (a) a groove in said closure member assembly expanding to multiple holes and a lock ring disposed in said groove and multiple screws respectively disposed in said holes to push said lock ring to secure said seat assembly with said closure member assembly (b) a groove in said flange expanding multiple holes and a lock ring disposed in said groove and multiple screws respectively disposed in said holes to push said lock ring and to secure said seat assembly with said flange (c) a groove in said housing expanding multiple holes and a lock ring disposed in said groove and multiple screws respectively disposed in said holes to push said lock ring to secure said seat assembly with said housing.

11. The valve of claim 8, wherein said flexible seal ring has one of plurality of configurations including (a) said flexible seal ring including a relatively larger inside diameter and a relatively larger outside diameter placed between said bore and said boss is pressed to form a W shape from an unformed shape and to fill gaps between said W shape teeth and said mated W shape teeth and attached to said bore (b) said flexible seal ring including a relatively smaller inside diameter and a relatively smaller outside diameter placed between said bore and said boss is pressed to form a W shape from an unformed shape and to fill gaps between said W shape teeth and said mated W shape teeth and attached to said boss (c) said flexible seal ring including a relatively lager inside diameter and a relatively smaller outside diameter placed between said bore and said boss is pressed to form a W shape from an unformed shape and to fill gaps between said W shape teeth and said mated W shape teeth and respectively attached to said bore and said boss.

12. The valve of claim 8, wherein said body assembly has one of plurality of structures including a three-piece body assembly and a two-pieces body assembly.

* * * * *